US012416168B2

(12) United States Patent
Staudenrausch et al.

(10) Patent No.: US 12,416,168 B2
(45) Date of Patent: Sep. 16, 2025

(54) RAPID CONNECTION SYSTEM FOR DETACHABLY HOLDING A FORMWORK SHELL AND FORMWORK BEAM

(71) Applicant: PERI SE, Weissenhorn (DE)

(72) Inventors: Guenther Staudenrausch, Weissenhorn (DE); Philipp Rusch, Weissenhorn (DE); Andreas Spiegl, Weissenhorn (DE)

(73) Assignee: PERI SE, Weissenhorn (DE)

( * ) Notice: Subject to any disclaimer, the term of this patent is extended or adjusted under 35 U.S.C. 154(b) by 358 days.

(21) Appl. No.: 17/997,353

(22) PCT Filed: Apr. 26, 2021

(86) PCT No.: PCT/EP2021/060811
§ 371 (c)(1),
(2) Date: Oct. 27, 2022

(87) PCT Pub. No.: WO2021/219536
PCT Pub. Date: Nov. 4, 2021

(65) Prior Publication Data
US 2023/0220690 A1 Jul. 13, 2023

(30) Foreign Application Priority Data
Apr. 27, 2020 (DE) ..................... 10 2020 111 413.3

(51) Int. Cl.
*E04G 17/02* (2006.01)
*B28B 7/00* (2006.01)
(Continued)

(52) U.S. Cl.
CPC ............ *E04G 17/02* (2013.01); *B28B 7/0014* (2013.01); *E04G 9/04* (2013.01); *E04G 9/05* (2013.01);
(Continued)

(58) Field of Classification Search
CPC .... E04G 9/04; E04G 9/05; E04G 9/06; E04G 11/08; E04G 17/02; E04G 2009/028; B28B 7/0014
See application file for complete search history.

(56) References Cited

U.S. PATENT DOCUMENTS 4,150,808 A 4/1979 Sawyer
2003/0096072 A1* 5/2003 Johnson .................... E04G 9/06 428/137
(Continued)

FOREIGN PATENT DOCUMENTS

CN 207349236 U 5/2018
CN 209557398 U 10/2019
(Continued)

*Primary Examiner* — Jessie T Fonseca
(74) *Attorney, Agent, or Firm* — SLEMAN & LUND LLP

(57) ABSTRACT

A formwork module for a formwork for a building part comprising at least one formwork carrier and at least one formwork shell, wherein at least one connector is situated between the formwork carrier and the formwork shell. The connector comprises at least one carrier element which is fastened on or in the formwork carrier, and at least one formwork shell element which is fastened in or on the formwork shell. The carrier element and the formwork shell element can be reversibly interconnected and form the connector by means of which the formwork shell can be reversibly connected to the formwork carrier. The use of a connector for detachably connecting a formwork carrier to a formwork shell and to a method for connecting a formwork shell to a formwork carrier of a formwork module. A method for separating a formwork shell from a formwork carrier of a formwork module.

18 Claims, 6 Drawing Sheets

(51) Int. Cl.

| | |
|---|---|
| ***E04G 9/04*** | (2006.01) |
| ***E04G 9/05*** | (2006.01) |
| ***E04G 9/06*** | (2006.01) |
| *E04G 9/02* | (2006.01) |
| *E04G 11/08* | (2006.01) |

(52) U.S. Cl.

CPC .......... *E04G 9/06* (2013.01); *E04G 2009/028* (2013.01); *E04G 11/08* (2013.01)

(56) References Cited

U.S. PATENT DOCUMENTS

| | | | | |
|---|---|---|---|---|
| 2004/0104333 | A1 * | 6/2004 | Ward | E04G 17/045 249/189 |
| 2009/0242733 | A1 * | 10/2009 | Ward | E04G 17/04 249/213 |
| 2019/0375130 | A1 * | 12/2019 | Huang | B28B 7/0014 |

FOREIGN PATENT DOCUMENTS

| | | | | |
|---|---|---|---|---|
| DE | 102011016120 | | 10/2012 | |
| DE | 102013107303 | A1 | 1/2015 | |
| DE | 102018106221 | | 9/2019 | |
| EP | 1647651 | A2 * | 4/2006 | E04G 19/00 |
| EP | 3173546 | | 5/2017 | |
| JP | H07171886 | A | 7/1995 | |
| JP | 2004353196 | | 12/2004 | |
| KR | 100785414 | B1 | 12/2007 | |
| KR | 20090003824 | U | 4/2009 | |
| KR | 20170115927 | A * | 10/2017 | |
| KR | 200493607 | Y1 * | 4/2021 | |
| KR | 20210157669 | A * | 12/2021 | |
| WO | WO-0222991 | A1 * | 3/2002 | E04G 9/05 |
| WO | 2020201278 | | 10/2020 | |

* cited by examiner

Fig. 1
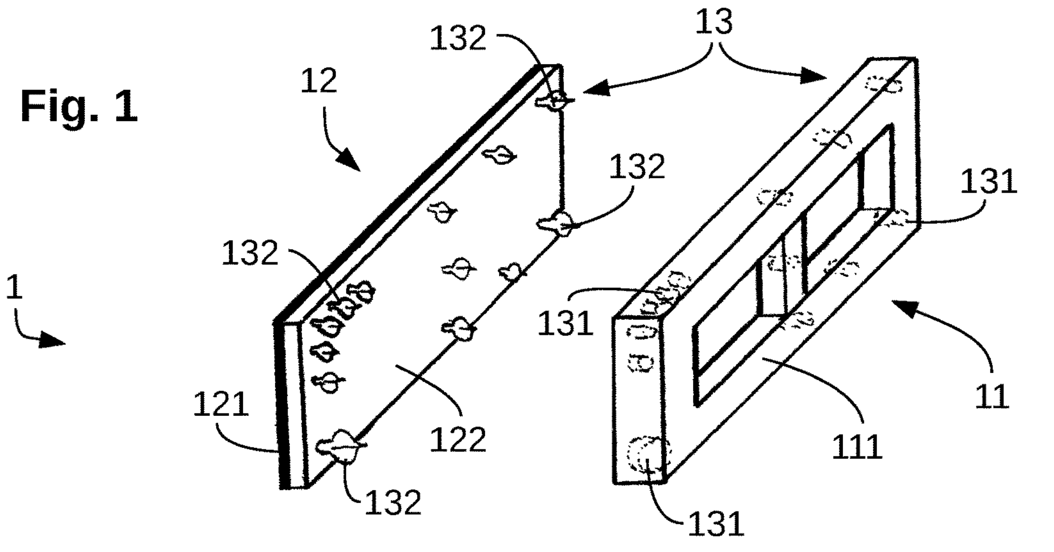
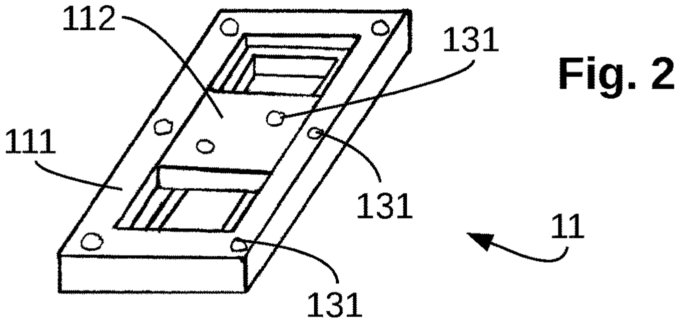
Fig. 2
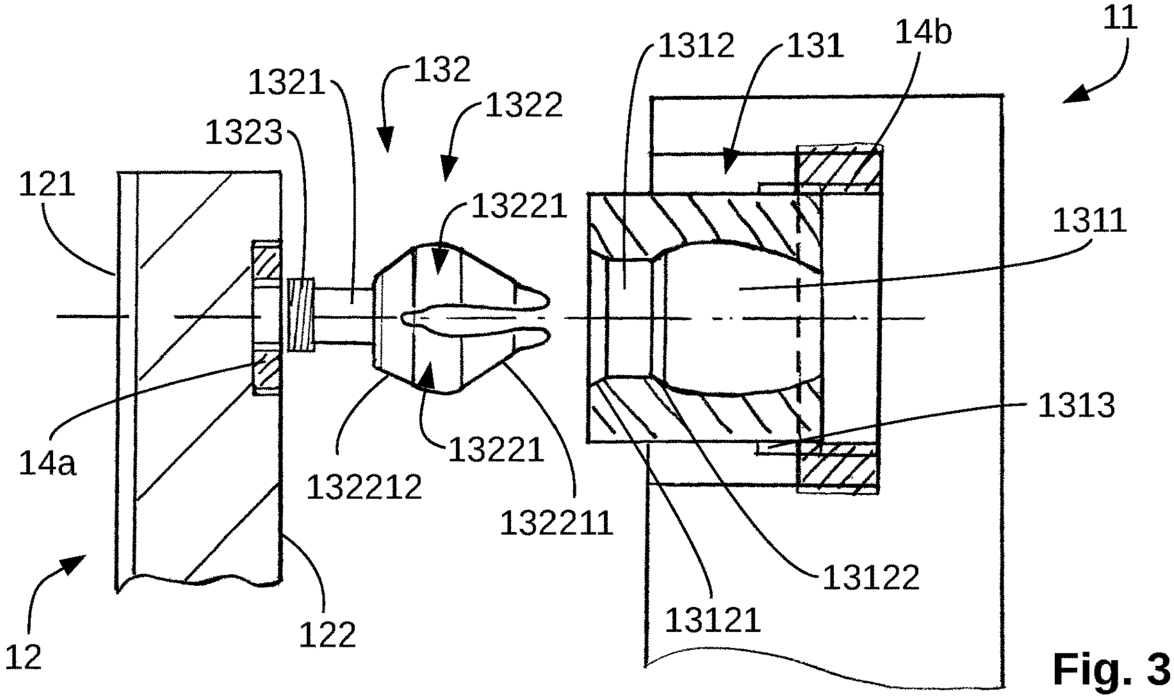
Fig. 3

Fig. 4
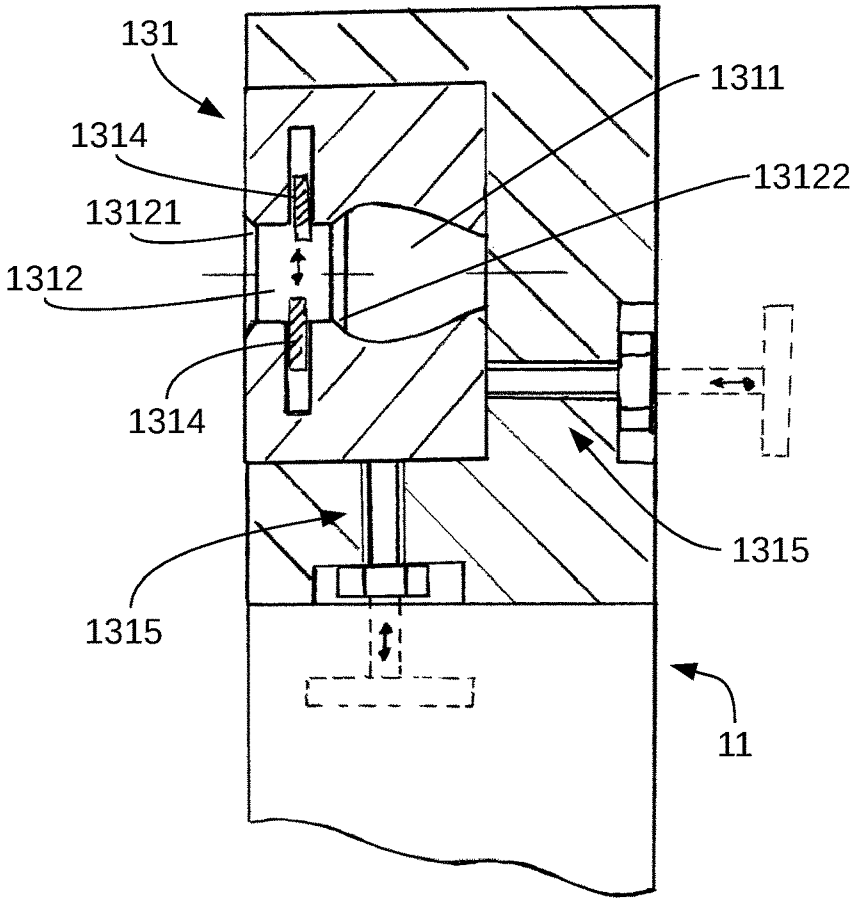
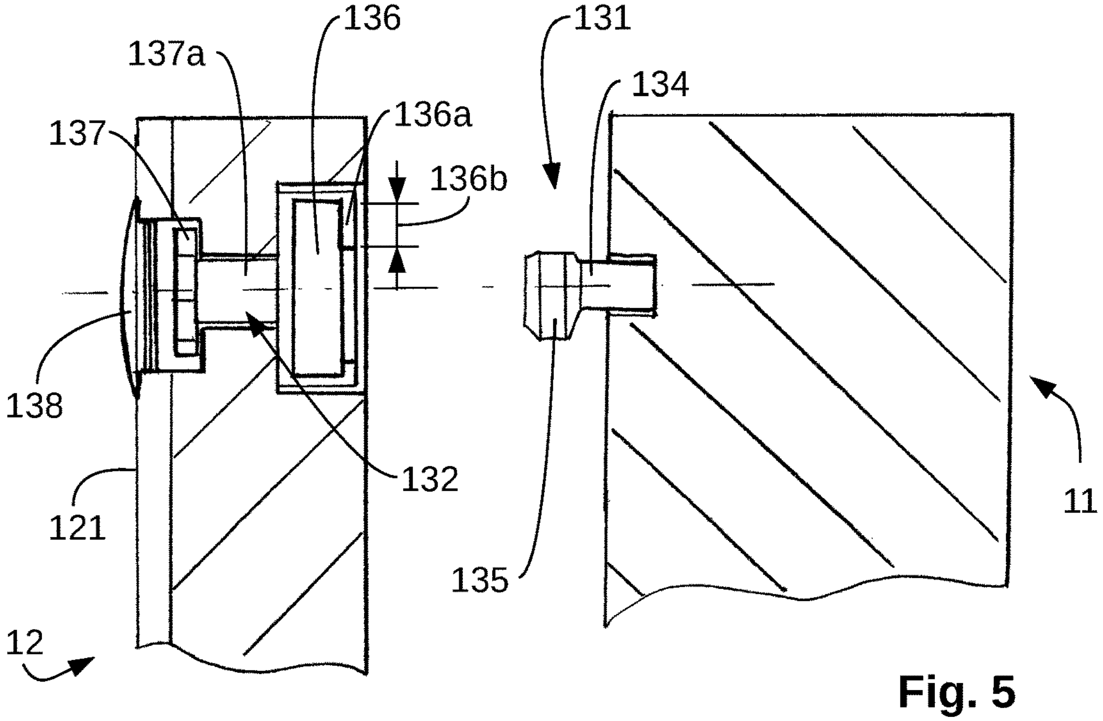
Fig. 5

Fig. 6
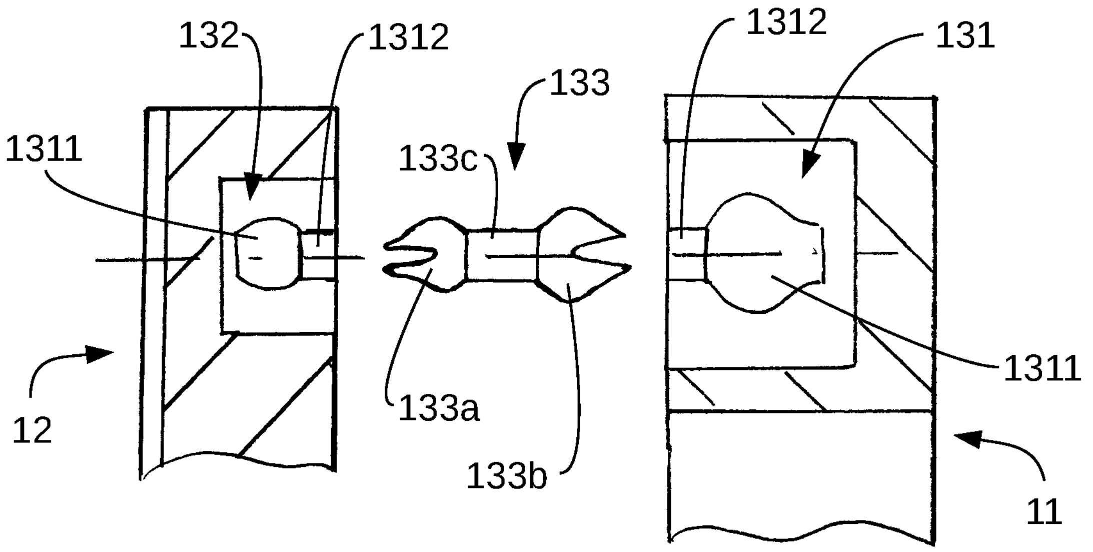
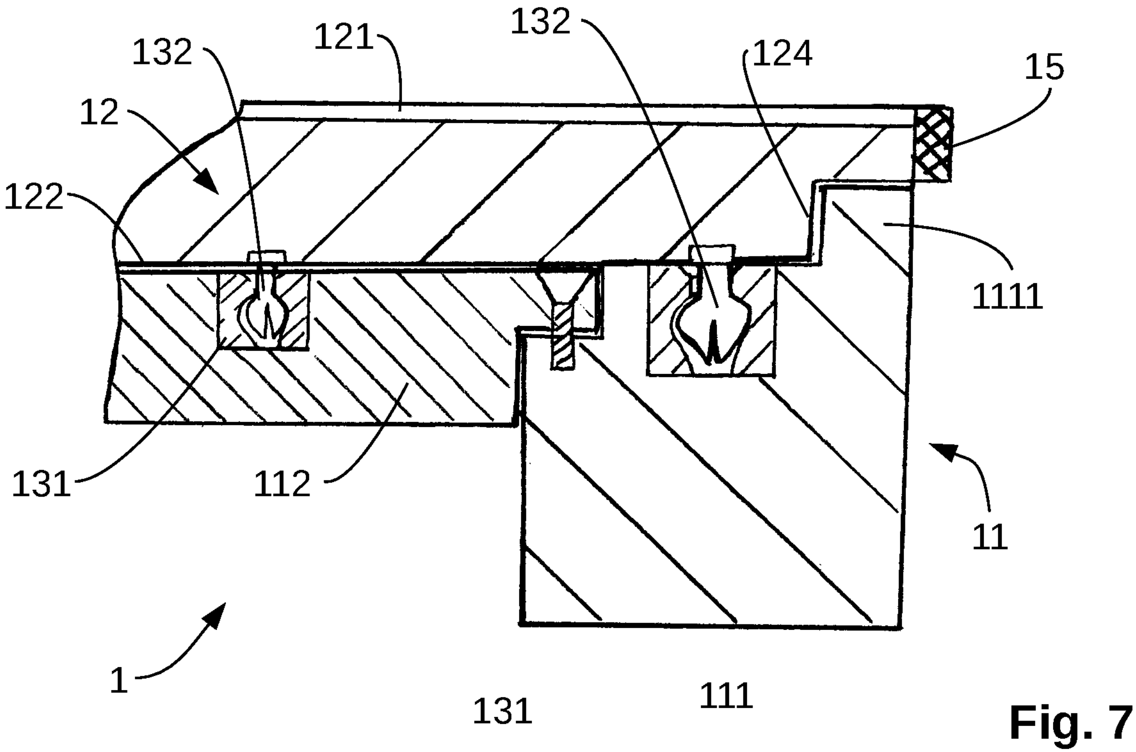
Fig. 7

Fig. 8
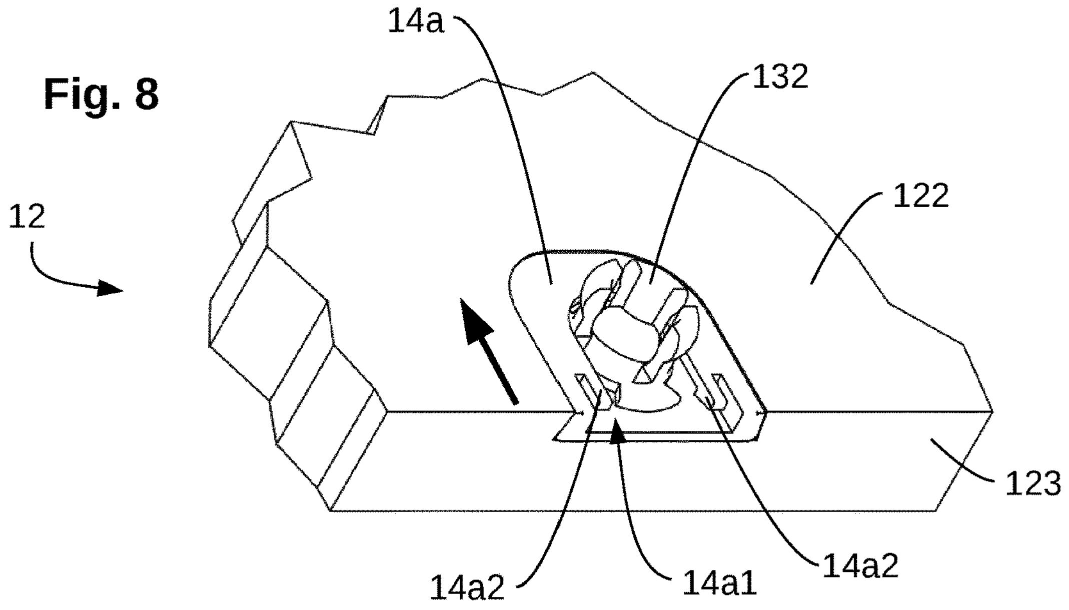
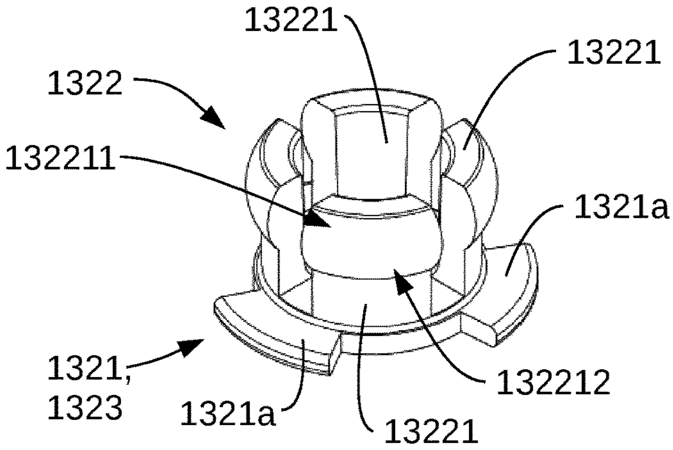
Fig. 9
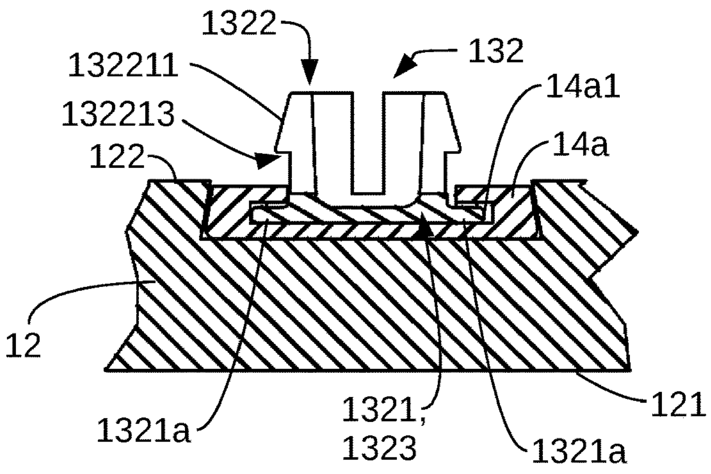
Fig. 10

Fig. 11
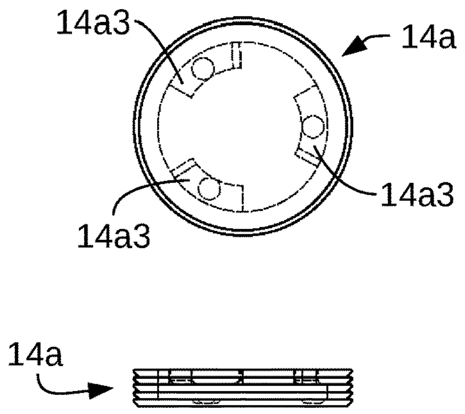
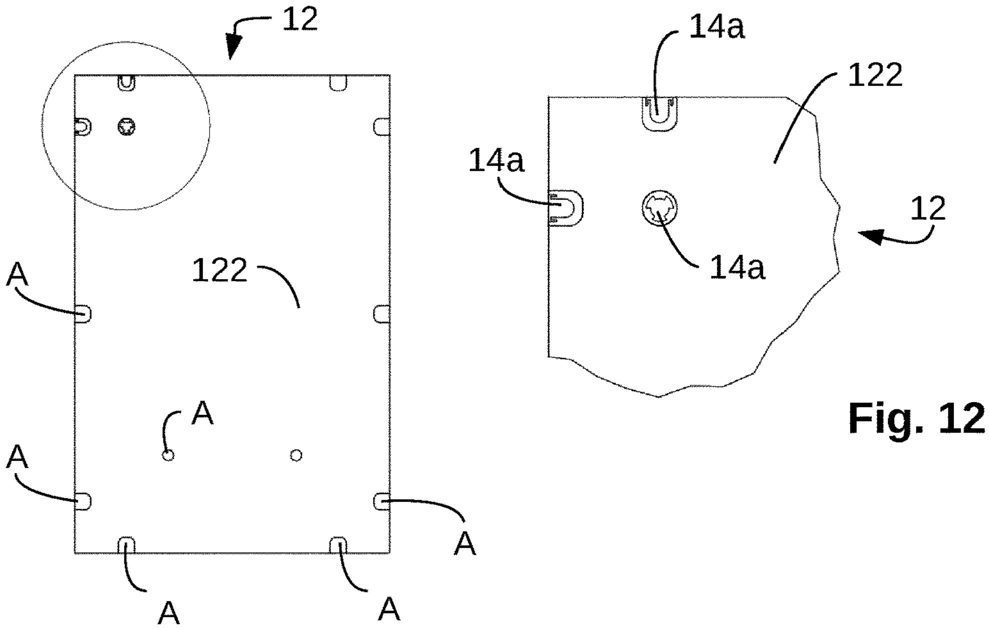
Fig. 12
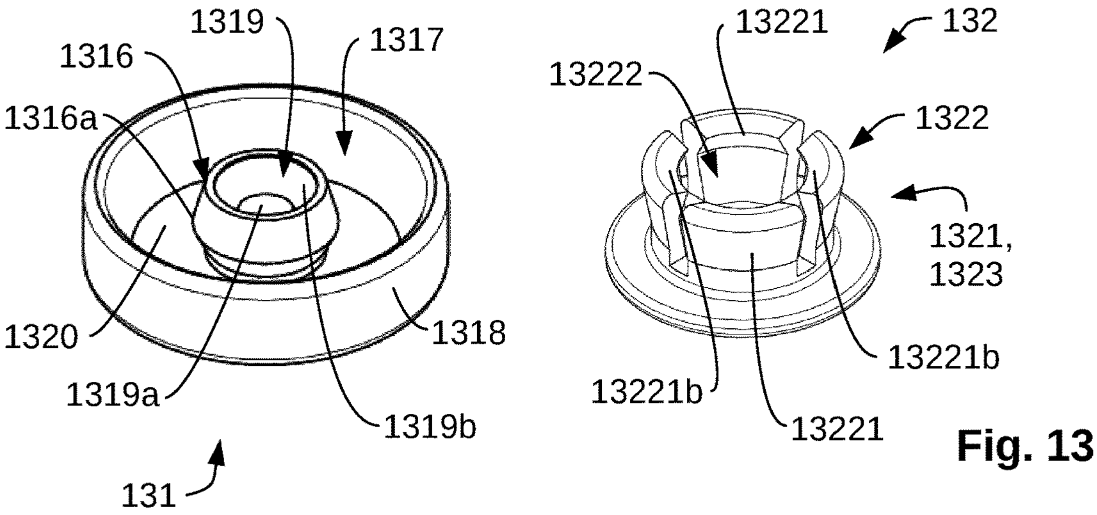
Fig. 13

Fig. 14
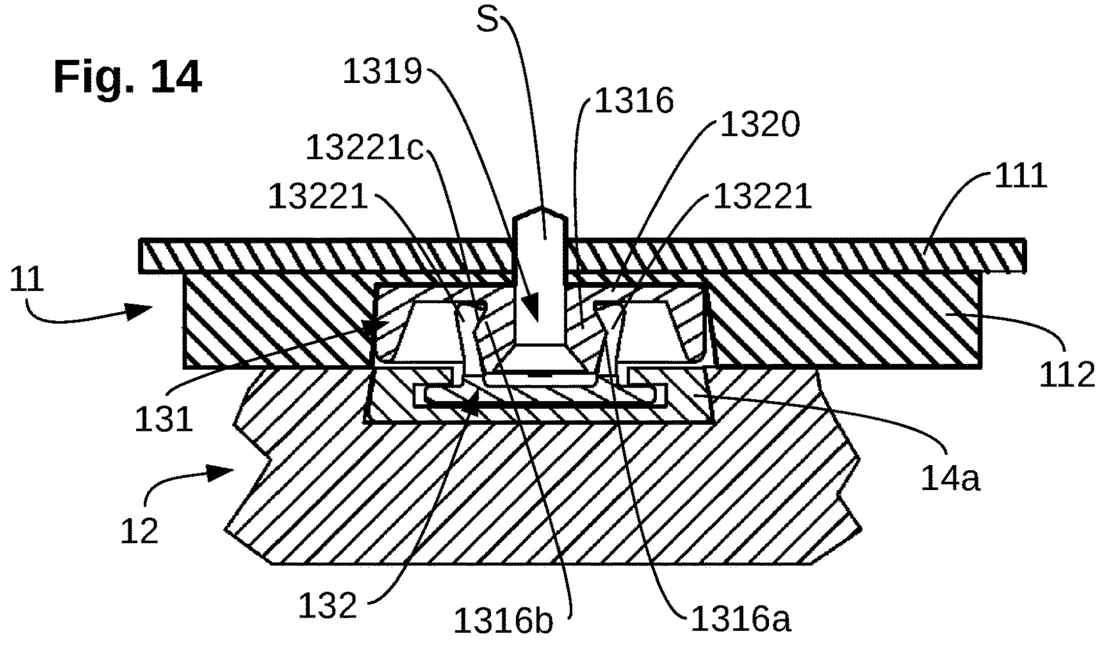
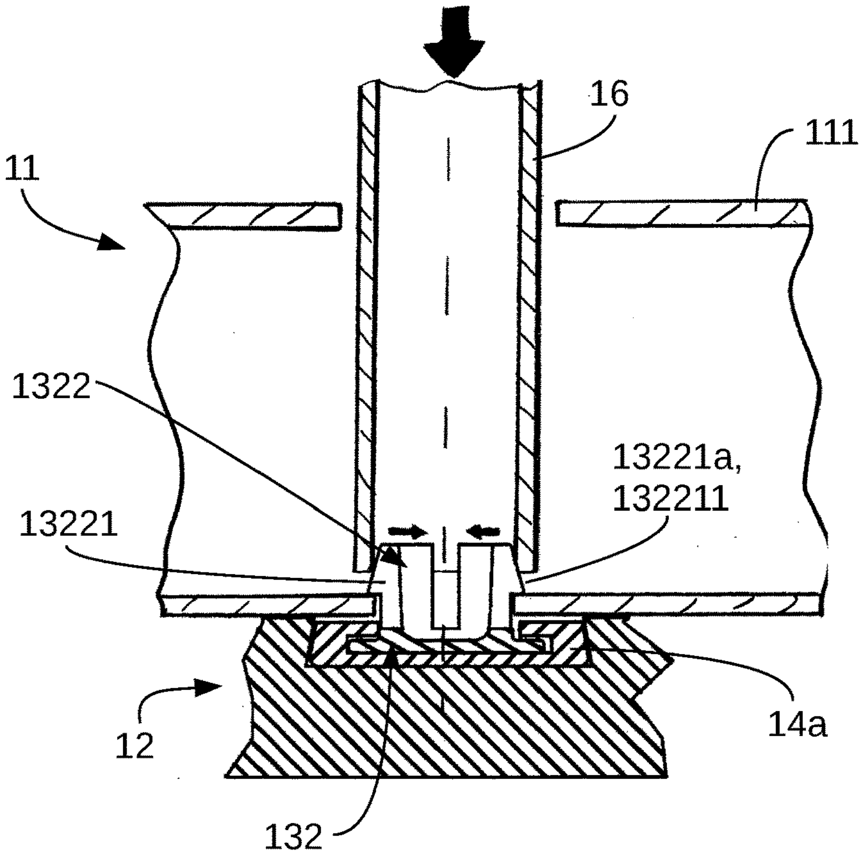
Fig. 15

RAPID CONNECTION SYSTEM FOR DETACHABLY HOLDING A FORMWORK SHELL AND FORMWORK BEAM

FIELD OF THE INVENTION

The invention relates to a formwork module for a formwork for a building part comprising at least one formwork carrier and at least one formwork shell, wherein at least one connector is situated between the formwork carrier and the formwork shell. The connector comprises at least one carrier element which is fastened on or in the formwork carrier, and at least one formwork shell element which is fastened in or on the formwork shell. The carrier element and the formwork shell element can be reversibly interconnected and form the connector by means of which the formwork shell can be reversibly connected to the formwork carrier. The invention further relates to the use of a connector for detachably connecting a formwork carrier to a formwork shell, and to a method for connecting a formwork shell to a formwork carrier of a formwork module. Finally, the invention relates to a method for separating a formwork shell from a formwork carrier of a formwork module.

BACKGROUND OF THE INVENTION

When buildings are erected walls, ceilings, pillars, or other elements of a building are produced from concrete materials. To this end, first, a mould for the building part to be erected, the formwork is erected. Into the formwork, then, a concrete material in the liquid state is filled. The concrete material hardens within the formwork. Sometimes, also reinforcements of a material different from the concrete material are introduced into the formwork, for example, metal meshes serving as a reinforcement. After the concrete material has hardened, the formwork is removed. During this procedure, the concrete material gets in contact with the formwork, the formwork being configured so that no liquid concrete material can flow out of the formwork. The area of the formwork coming into sealing contact with the liquid and later hardened concrete material is the formwork shell. When separating the formwork from the hardened concrete material often damage is caused to the formwork shell. Therefore, formwork shell elements have to be replaced or exchanged from time to time. Furthermore, various formwork shells or formwork shell elements exist for different required surface qualities of the building part to be erected. The formwork shell itself is usually not designed to receive the load of the concrete material alone. Therefore, a formwork usually also comprises a formwork carrier receiving and deflecting the loads and forces encountered when the liquid concrete material is poured in. When erecting and dismantling a formwork, therefore, the formwork shell support and the formwork shell have to be connected to each other and separated from each other again.

A known approach for connecting a formwork shell to a formwork carrier is a connection of both elements by means of rivets. These rivets are introduced upon connection and destroyed in the subsequent separation of the formwork shell and the formwork carrier. Therefore, this approach is elaborate and generates wear both on the formwork shell and on the formwork carrier. Furthermore, the positions in which rivets were inserted into the formwork shell can later be seen on the erected building part. In case of high quality requirements on the surface of the building part to be erected, the generated rivet imprints are annoying and undesired.

From the DE 10 2013 107 303 A1, a formwork panel for concreting formwork is known in which both the formwork carrier and the formwork shell are made of a plastic material. The connection of the two elements is realised by clip connections. A disadvantage of the described solution is that, for separating the two elements, either every single clip connection has to be separated using a tool, or the clip connections are destroyed upon separation. In the disclosed formwork panel, therefore, major effort arises upon separation, or the formwork shell can only be used once, respectively, which results in a large amount of plastic waste and generates expenses for continuously providing new formwork shells.

SUMMARY OF THE INVENTION

Therefore, the object of the invention is to propose solutions rendering a simple connection and separation of the formwork shell and the formwork carrier possible while both the formwork shell and the formwork carrier should be used multiple times.

This object is solved by a formwork module for a formwork for a building part comprising at least one formwork carrier, and at least one formwork shell, wherein at least one connector is situated between the formwork carrier and the formwork shell, and the connector comprises at least one carrier element which is fastened on or in the formwork carrier and at least one formwork shell element which is fastened in or on the formwork shell; and the carrier element and the formwork shell element can be reversibly interconnected and form the connector by means of which the formwork shell can be reversibly connected to the formwork carrier. The reversible connection between the carrier element and the formwork shell element is separable by applying a force in the normal direction to the formwork shell directed away from the formwork carrier which is larger than a threshold separation force, and connectable by applying a force in the normal direction to the formwork shell directed towards the formwork carrier which is larger than a threshold connecting force. The formwork shell element has a formwork shell attachment portion which is connected to the formwork shell, and the connection between the formwork shell element and the formwork shell is configured so that it is releasable. Furthermore, a formwork shell adapter is situated between the formwork shell element and the formwork shell, the formwork shell adapter being a component which facilitates detaching and connecting the formwork shell element from/to the formwork shell, and the formwork shell adapter remains on or in the formwork shell when the formwork shell element is exchanged.

A formwork module according to the invention solves the object the invention by a connector configured to be reversibly connectable and separable being situated between a formwork carrier and a formwork shell. The formwork shell and the formwork carrier can therefore be connected to each other and then separated from each other multiple times. Here, reversibly means that the connector is not destroyed when connected and separated. The connector is therefore substantially destruction-free. Of course, it may happen that, in case of a higher number of connecting and separating processes, wear will occur so that the quality of the connection by means of the connector will deteriorate in the course of time. A formwork module according to the invention is configured so that it withstands at least 20 connecting and separation processes of the formwork shell and the formwork carrier without significant loss of quality. Therefore, reversible means that a connection with one and the same connector is possible multiple times in sequence and that the connector maintains its functionality of connecting the formwork shell and the formwork carrier in the process. The at least one connector of a formwork module according to the invention comprises two parts: a carrier element is part of the connector and is fastened on or in the formwork carrier. The counterpart of the carrier element is a formwork shell element which is also part of the connector. The formwork shell element is fastened on or in the formwork shell. An attachment to the formwork carrier or to the formwork shell means that the associated element, at least partly, protrudes beyond the formwork carrier or the formwork shell. An attachment in the formwork carrier or in the formwork shell means that the associated element is situated within the formwork shell or the formwork carrier and does not protrude from it. With the at least one connector enabling a reversible connection and separation of its two counterparts, the carrier element and the formwork shell, the connection of the formwork shell to the formwork carrier is also configured so that it is reversible. Typically, more than one connector is situated between the formwork shell and the formwork carrier. A stable connection between the formwork shell and the formwork carrier is favourably achieved by providing a plurality of connectors attached to various positions of the formwork shell and the formwork carrier. The connector, i.e., the connection between the carrier element and the formwork shell element is separable by applying a normal force to the formwork shell which is directed away from the formwork carrier. The formwork shell has a concrete side which, in the state connected to the formwork carrier, faces away from the formwork carrier and gets in contact with the concrete material when a building part is erected. A normal force or a force in the normal direction to the formwork shell means a force which is oriented orthogonal to the surface of the concrete side. In other words, the connector can be separated by applying a pulling force to the formwork shell which is directed away from the formwork carrier. For a separation of the carrier element and the formwork shell element, however, the applied normal force has to be larger than a threshold separation force. If the applied normal force is smaller than this threshold separation force the carrier element cannot be detached from the formwork shell element, and the connector remains connected. The threshold separation force is selected so that it is sufficiently small to enable a separation of the formwork shell from the formwork carrier, for example by one or two persons. At the same time, the threshold separation force is selected so that the formwork shell will not become detached from the formwork carrier unintentionally. During the casting and hardening of the concrete material in the formwork as well, normal forces to the formwork shell will occur. It is not desirable that the normal forces generated when concrete is cast will detach the connector. The threshold separation force is therefore selected so that normal forces generated when a building part is erected and acting on the formwork shell are received by the connector without it becoming detached. The carrier element separated from the formwork shell element can be connected to the carrier element by applying a normal force towards the formwork shell, particularly in the direction towards the concrete side of the formwork shell. For establishing the connection between the formwork shell element and the carrier element, however, the applied normal force has to be larger than a threshold connecting force. If the applied normal force is smaller than this threshold connecting force the formwork shell element will not be connected to the carrier element. For connecting the connector, a pressing force orthogonal to its surface facing the concrete material is applied to the formwork shell. Here, the threshold separation force and the threshold connecting force can be selected so that they are of identical or different magnitude. According to the invention, at least one part of the connector is configured so that it is detachable from the formwork shell or from the formwork carrier. For this purpose, the formwork shell element may have a formwork shell attachment portion which is directly or indirectly connected to the formwork shell. This connection is configured so that it is releasable. This means that the formwork shell element can be separated from the formwork shell in a destruction-free manner. Therefore, the formwork shell element can be exchanged in a simple manner if, after a certain number of connecting cycles to the carrier element, wear has occurred. Alternatively or in addition, the carrier element may comprise a carrier attachment portion which is connected to the formwork carrier. This connection between the carrier attachment portion and the formwork carrier as well is configured so that it is releasable so that the carrier element can be removed from the formwork carrier and replaced by another carrier element in a simple manner. According to the invention, either only the formwork shell element may be configured so that it is detachable from the formwork shell, of only the carrier element may be configured so that it is detachable from formwork carrier, or both the formwork shell element may be configured so that it is detachable from the formwork shell and the carrier element may be configured so that it is detachable from formwork carrier. A formwork element according to the invention is advantageous as compared to prior art in that the connection and separation of the formwork shell and the formwork carrier is possible in a very simple way by applying a normal force towards or away from the formwork shell. Particularly, no tool is required for connecting or separating the formwork shell and the formwork carrier. Connecting or separating the formwork shell and the formwork carrier may, in a simple manner, also be carried out by untrained staff. The connection and separation of the formwork shell and the formwork carrier can be carried out much faster than in the known approach in which the two elements are connected to each other by rivets. Another advantage of the formwork element according to the invention is that the connection between the formwork shell and the formwork carrier can be established and separated multiple times in sequence. It is therefore, for example, possible to use the same combination of formwork carrier and formwork shell multiple times for erecting various building parts. Moreover, it is also possible to connect different formwork shells to different formwork carriers. The formwork shell and the formwork carrier may therefore be used multiple times, respectively, which reduces the efforts and costs for providing materials at the construction site. Particularly advantageous is the detachability according to the invention, particularly the destruction-free detachability of at least one part of the connector, for example of the formwork shell element or the carrier element, from a part of the formwork module. Should, after multiple use, part of the connector be so worn that the connecting function is no longer securely fulfilled a part of the connector can simply be exchanged. The formwork shell and the formwork carrier are therefore not affected by the wear of the connector and may otherwise be repeatedly used for assembling a formwork as they are. It is possible to exchange the formwork shell element and/or the carrier element either after a defined number of connecting cycles, or simply after a visual check, and to thereby ensure a rapid and reliable connection between the formwork shell and the formwork carrier for the long term.

In one embodiment, it is contemplated that a plurality of formwork shell elements are disposed on a mounting side of the formwork shell, and a plurality of carrier elements are disposed on the side of the formwork carrier facing the formwork shell, and that therefore a plurality of connectors is provided, the connectors being unevenly distributed across the formwork shell and the formwork carrier, wherein, particularly, a higher number of connectors per surface area is situated in the peripheral portion and/or at the edges than in the central area of the formwork shell and the formwork carrier. In this embodiment, a plurality of connectors is provided for connecting a formwork shell to a formwork carrier. The formwork shell has a concrete side facing the concrete material when a building part is erected. Opposite of this concrete side, there is the mounting side of the formwork shell which faces the formwork carrier when it is connected to it. On the mounting side of the formwork shell, a plurality of formwork shell elements is disposed, at the same time, a plurality of carrier elements is disposed on the side of the formwork carrier facing the formwork shell. In this embodiment, the connectors respectively formed of a formwork shell element and a carrier element are unevenly distributed across the formwork shell and the formwork carrier. Here, unevenly means that the distances between neighbouring connectors are, at least partly, different in size. It has been found that, when a building part is erected, larger normal forces occur in the peripheral portion of a formwork module than in the central area removed from the peripheral portion during the hardening of the concrete material or upon separation of the individual formwork modules from the hardened concrete material. These normal forces should not result in a separation of the connection between the formwork shell element and the carrier element. Here, the peripheral portion is to be understood to be the area of the formwork shell and the formwork carrier which, when regarded from a normal direction to the formwork shell, is situated around the outer circumference of the formwork shell. This peripheral portion may, for example, extend 1 to 30 cm, preferably 2 to 20 cm in the direction of the centre of the formwork shell measured from its outer edge.

To counter the higher normal forces acting on the formwork shell in this edge or corner area which are to be received by the connectors without a separation occurring, the number of connectors per surface area is selected larger in the peripheral portion than in the centre of the formwork shell and of the formwork carrier. In the peripheral portion, therefore, the density of the connectors is selected larger than in the centre. In this way, it is ensured that, in the peripheral portion of the formwork shell and the formwork carrier more intensely exposed to normal forces, no unintended separation of the connector will occur. In the central area of the formwork shell and the formwork carrier, the density of connectors is selected smaller since lesser normal forces to be compensated by the connected connectors will occur here. Owing to the reduced density of connectors in the central area, the sum the threshold forces of all connectors is kept low so that, in case of an intentional separation of the formwork shell and the formwork carrier, this separation can be achieved with an acceptable cumulative threshold separation force.

In an alternative embodiment, it is contemplated that a plurality of formwork shell elements is disposed on the mounting side of the formwork shell, and a plurality of carrier elements is disposed on the side of the formwork carrier facing the formwork shell, and that therefore a plurality of connectors is provided, wherein the connectors have different threshold separation forces, and connectors having higher threshold separation forces are disposed in the peripheral portion and/or at the edges, and connectors having lower threshold separation forces are disposed in the central area of the formwork shell and the formwork carrier, wherein, particularly, the connectors are based on the same or different operating principles. In this embodiment as well, a plurality of connectors is disposed between the formwork shell and the formwork carrier. These connectors, at least partly, differ from each other in that they have different threshold separation forces. Here, such connectors having different threshold separation forces may either be of the same design and differently dimensioned, or the connectors may be of different design and based on different operating principles. Various embodiments of types and operating principles will be described below. In order to compensate the higher normal forces encountered in the peripheral portion of the formwork shell and of the formwork carrier, connectors having a higher threshold separation force are disposed in the peripheral portion and or at the edges. In the central area of the formwork shell and the formwork carrier, on the other hand, connectors having low threshold separation forces are placed. Here, the connectors may be either arranged at regular intervals to each other, or alternatively also in irregular intervals to each other. In this embodiment as well, the higher normal forces to be compensated which arise in the peripheral portion when a building part is erected are compensated by a higher density of the threshold separation force. In the central area, connectors having a smaller threshold separation force are disposed to keep the sum of the threshold separation force required for removing the formwork shell from the formwork carrier low.

Furthermore, it may be contemplated that, in the peripheral portion and/or at the edges of the formwork shell and the formwork carrier, at least one material connection, particularly an adhesive connection is provided. In this embodiment, a material connection is established in addition to the provision of one or more connectors between the formwork shell and the formwork carrier. This material connection is disposed in the peripheral portion which is exposed to higher normal forces when a building part is erected or when the formwork module is removed from the erected building part. The material connection therefore supports the connection of the formwork shell to the formwork carrier provided for by the connector or the connectors. When the formwork shell is separated from the formwork carrier the material connection is destroyed. However, this destruction of a material connection does not cause any or only minor wear on the formwork shell and the formwork carrier.

In an alternative embodiment, it is contemplated that the carrier element is formed by a section of the formwork carrier, wherein, particularly, the carrier element is formed by a recess in the formwork carrier. In this embodiment, a section or also an element of the formwork carrier is provided as a carrier element of the connector. In this embodiment, the carrier element is directly provided by the formwork carrier. In particular, a recess or hole provided in the formwork carrier is provided as the carrier element. This recess may be situated in the frame of the formwork carrier or also in a support panel connected to the frame which will be further described below. For a reversible connection, the formwork shell element is simply inserted into such a recess in the formwork carrier. The recess in the formwork carrier is, as a carrier element, part of the connector. This embodiment is advantageous since no carrier element formed by a separate component has to be provided and connected to the formwork carrier. This embodiment is therefore particularly easy to produce and therefore cost-effective.

In a favourable embodiment, it is contemplated that the formwork shell adapter is form-closed connected to the formwork shell and/or that the formwork shell element is form-closed connected to the formwork shell adapter. In this embodiment, the formwork shell adapter is connected to the formwork shell by means of a form-closed connection. This means that the formwork shell adapter and the formwork shell are formed so that portions of the two elements engage and that therefore a fixed connection between the two elements is established. Here, this form-closed connection is, at least, configured so that it is effective in the normal direction to the formwork shell surface. In this way, the form-closed connection prevents the formwork shell adapter and the formwork shell from being separated from each other by the application of a normal force to the formwork shell. The form-closed connection thus counteracts a separation of the formwork shell and the formwork shell adapter when pulling and pressure forces are applied to the formwork shell in the normal direction. Alternatively or in addition, the connection of the formwork shell element to the formwork shell adapter may, correspondingly, also be configured form-closed to thereby prevent a separation of the formwork shell adapter and the formwork shell element when forces in the normal direction act towards the formwork shell surface. Alternatively, it is also possible that the formwork shell adapter is connected to the formwork shell by means of a force-fit connection, for example by press fitting, or by means of a material connection, for example by an adhesive connection. Preferably, the formwork shell adapter and the formwork shell are configured so that both have approximately the same service life. The formwork shell adapter thus remains on or in the formwork shell throughout the service life of the formwork shell. In order to guarantee such a long service life which is in the range of several years, a long-term stable, form-closed connection between the formwork shell adapter and the formwork shell is ideal.

Skillfully, it is contemplated that the formwork shell has a concrete side which, in use of the formwork module, faces the building part to be constructed, and that the formwork shell has a mounting side located opposite of the concrete side which faces the formwork carrier, the formwork shell element and the formwork shell adapter being situated on or in the mounting side, wherein the formwork shell adapter is insertable into the formwork shell by a movement parallel to the mounting side of the formwork shell on the mounting side of the formwork shell, and, in the state inserted into the formwork shell, a form-closed connection exists between the formwork shell and formwork shell adapter in a direction perpendicular to the mounting side. In this embodiment, the formwork shell adapter and the formwork shell element are situated on or in the mounting side of the formwork shell facing away from the concrete side. Here, the form-closed connection between the formwork shell adapter and the formwork shell is configured so that it can be established by a sliding movement of the formwork shell adapter relative to the formwork shell. This sliding movement is directed parallel to the formwork shell surface or parallel to the mounting side. The sliding movement is therefore perpendicular to the effective direction of the form-closed connection. This embodiment is advantageous in that the formwork shell adapter can be connected to the formwork shell in a simple manner. Precisely in series production, such a simple type of connection is advantageous since it renders short cycle times for the production of a formwork shell comprising a plurality of formwork shell adapters integrated therein possible. In this embodiment, for example, the form-closed connection maybe configured as a form-closed connection of the type of a dovetail.

Furthermore, it is contemplated that, in a side view from a direction perpendicular to the mounting side, the formwork shell has a recess having an undercut, and that the formwork shell adapter is inserted into the recess, wherein a section of the formwork shell adapter is situated in the undercut of the recess, and a form-closed connection between the formwork shell and the formwork shell adapter is provided in a direction perpendicular to the mounting side in this way. In this embodiment, a recess which, in a plan view of the edge of the formwork shell, has an undercut formed in the formwork shell. In addition, the formwork shell adapter has a shape which is, in sections, insertable into this undercut. For example, a dovetail-shaped recess respectively having an undercut in its edge portions may be formed, particularly milled into the formwork shell from the lateral edge. The edge portions of the formwork shell adapter are consequently formed as geometrical negative shape to the dovetail-shaped recess and can be inserted into the recess with minimal clearance in this way.

In an alternative embodiment, it is contemplated that, in a plan view of the mounting side, the formwork shell has a recess having defining walls extending perpendicular to the mounting side, and that the formwork shell adapter is pressed into the recess in a direction perpendicular to the mounting side, wherein at least a portion of the formwork shell adapter is disposed in the recess, and a force-fitted connection between the formwork shell and the formwork shell adapter is provided in a plane parallel to the mounting side in this way. In this embodiment, the formwork shell adapter and the formwork shell are force-fitted connected by means of a press fit connection which is established by a pressing movement in a direction perpendicular to the surface or to mounting side of the formwork shell. In this embodiment, a recess which does not completely extend through the formwork shell in its thickness direction is provided in the formwork shell. This recess is defined by defining walls extending perpendicular to the mounting side so that this recess does not have an undercut. The formwork shell adapter has a corresponding negative shape which, however, is configured so that it is slightly larger in its outer diameter than the inner diameter of the recess. Owing to this oversize, a force-fitted press fit fixing the formwork shell adapter relative to the formwork shell is established when the formwork shell adapter is pressed into the formwork shell. In the area of the outer circumference of the formwork shell adapter, supportive protruding ribs or nubs may be provided which facilitate the insertion of the formwork shell adapter into the recess. This embodiment is advantageous in that no undercut has to be produced in a recess in the formwork shell. A fixation of the formwork shell adapter relative to the formwork shell may, of course, also be realised by a combination of a form-closed connection and a force-fitted connection. For example, the form-closed connection described above in which the formwork shell adapter is inserted into a recess by a sliding movement may additionally be provided with a slight oversize so that the sliding movement can only be carried out by overcoming a resistance, and therefore an additional non-force-fitted connection is established. This combination has the effect that the formwork shell adapter is force-fitted fixed in the sliding direction and will not unintentionally be pulled out of the formwork shell by a reverse sliding movement. Moreover, the formwork shell adapter may be connected to the formwork shell by additional connecting elements such as, for example, screws or nails.

In another embodiment, it is contemplated that the formwork shell adapter is situated directly adjacent to the edge of the formwork shell or in a distance to the edge of the formwork shell as viewed from a direction perpendicular to the mounting side. In this embodiment, the formwork shell adapter may be located in various positions relative to the edge of the formwork shell as viewed from a direction perpendicular to the formwork shell surface or the mounting side. For the embodiment described above in which the formwork shell has a recess having an undercut and the formwork shell adapter is connected to this recess by a sliding movement, an arrangement directly adjacent to the edge of the formwork shell is advantageous since, in this way, the formwork shell adapter can be inserted in a simple manner. However, this type of form-closed connection may also be provided in a distance from the edge of the formwork shell. In this case, an insertion portion is formed in the surface of the formwork shell through which the undercut can be produced in the recess, for example, by a corresponding form cutter being inserted into the insertion portion and then used to produce the undercut. Through this insertion portion, also the formwork shell adapter can then be inserted and pushed into the recess having the undercut. Alternatively, in case of an arrangement of the formwork shell adapter in a distance from the edge of the formwork shell, also a type of connection may be selected in which the formwork shell adapter is pressed into a recess without an undercut from the mounting side by means of a press-fit connection. Of course, it is also possible to provide a plurality of formwork shell adapters on a formwork shell some of which are, for example, disposed directly adjacent to the edge of the formwork shell, and some in a distance from the edge. This plurality of formwork shell adapters may also have different configurations and, particularly, also different dimensions to accommodate formwork shell elements having different load-bearing capacities.

Furthermore, it is contemplated that the formwork shell adapter has a recess having an undercut into which the formwork shell element is reversibly insertable, wherein this reversible connection of the formwork shell element and the formwork shell adapter is, at least partly, formed by a form-closed connection of a portion of the formwork shell element to the undercut of the recess in the formwork shell adapter. In this embodiment, the connection of the formwork shell element to the formwork shell adapter is form-closed. This form-closed connection is configured so that it counteracts a separation of the formwork shell element and the formwork shell adapter when a force perpendicular to the mounting side is applied. For this purpose, a recess having an undercut is provided in the formwork shell adapter. When the form-closed connection is established a section of the formwork shell element will then become engaged in this undercut. Of course, the undercut may, alternatively, also be disposed on formwork shell element, and a section of the formwork shell adapter may become form-closed engaged in this undercut. For establishing this form-closed connection, various effective relative movements may be provided for between the formwork shell element and the formwork shell adapter. Such a form-closed connection of the formwork shell element to the formwork shell adapter is advantageous in that the formwork shell element can be separated from the formwork shell adapter and therefore exchanged in a simple manner. Such a form-closed connection can be manually established and separated in a simple manner without applying large forces and momentums. The replacement of even a larger number of formwork shell elements can therefore be carried out easily and rapidly.

Favourably, it is contemplated that the form-closed connection between the formwork shell element and the formwork shell adapter can be established and released by a linear movement of the formwork shell element relative to the formwork shell adapter in a direction parallel to the mounting side. In this embodiment, the formwork shell element can be connected to and separated from the formwork shell adapter by a sliding movement. Here, for example, a section of the formwork shell element may be inserted into an undercut in the formwork shell adapter to establish a form-closed connection. There are no particular limitations with regard to the design of the undercut and of the associated negatively shaped section on the formwork element. For example, the undercut and the protruding section on the formwork shell element may have the shape of a dovetail.

In an alternative embodiment, it is contemplated that the form-closed connection between the formwork shell element and the formwork shell adapter can be established and released by a rotating movement of the formwork shell element relative to the formwork shell adapter about a rotational axis which is oriented perpendicular to the mounting side. In this embodiment, the form-closed connection is established and released by the formwork shell element being rotated relative to the formwork shell adapter. With this rotational movement, a form-closed connection of a section of the formwork shell element in an undercut in the formwork shell adapter is established during the installation. This principle is similar to the functional principle of a bayonet lock. Performing such a rotational movement for dismounting and mounting a formwork shell element in the formwork shell adapter is also simple and possible by hand and therefore renders the exchange of a formwork shell element particularly easy. It is also possible to arrange a plurality of formwork shell adapters and formwork shell elements on a formwork shell, wherein some of the connections between the formwork shell adapter and the formwork shell element can be established and released by a linear movement and other ones of these connections can be established and released by a rotating movement. In formwork shell adapters which are situated at the edge of the formwork shell, it is particularly favourable to provide for a linear movement, and in formwork shell adapters which are situated on the inside at a distance from the edge of the formwork shell, for a rotational movement for establishing the form-closed connection to the formwork shell element.

Furthermore, it is contemplated that the formwork shell is configured in a panel-shape and has a concrete side which, in use of the formwork module, faces the building part to be constructed, and that the formwork shell has a mounting side located opposite of the concrete side which faces the formwork carrier, wherein the formwork shell element is disposed on or in the mounting side. In this embodiment, the formwork shell is panel-shaped and has two large main surfaces which are large relative to the circumferential edge surface. For example, such a panel-shaped formwork shell may be formed by a plywood panel. One of these large main surfaces is the concrete side which, when forming, faces the concrete material and is typically provided with a coating. On the opposite side of this concrete side, the mounting side is situated on or in which the formwork elements are positioned. Typically, the concrete side and the mounting side are oriented parallel to each other.

Skillfully, it is contemplated that the formwork shell is configured so that it is multi-layered. In this embodiment, the formwork shell comprises a plurality of layers or plies. Here, these layers may be formed of the same material, for example a wood material. Alternatively, however, also layers may be provided which are made of different materials.

Furthermore, it is contemplated that the formwork carrier has a frame, and that the carrier element is disposed on or in the frame on its side facing the formwork shell. In this embodiment, the formwork carrier has a frame which, for example, extends around the formwork carrier at its outer edge. Furthermore, the frame may have struts. The frame is favourably designed as a lightweight construction made of a metal material, for example of metal pipes. The carrier element is situated on the side of the frame facing the formwork shell.

It is contemplated that the reversible connection between the carrier element and the formwork shell element receives forces in the normal direction to the concrete side which are smaller than the threshold separation force. The connector is designed to receive pulling and pressure forces which act between the formwork shell and the formwork carrier, and which are smaller than the threshold separation force. In this way, it is ensured that the formwork shell and the formwork carrier remain securely connected to each other and do not separate unintentionally when a building part is erected.

Moreover, it is contemplated that the reversible connection between the carrier element and the formwork shell element receives transverse forces which extend orthogonal to the normal direction towards the concrete side. The connector is configured so that it can also receive forces which act between the formwork shell and the formwork carrier and are oriented in another direction than the normal direction to the formwork shell. These are particularly transverse or shear forces acting orthogonal to the normal direction.

Skillfully, it is contemplated that the reversible connection between the carrier element and the formwork shell element is configured so that it is force-fitted and/or form-closed. Force-fitted connecting elements are particularly favourable for a reversible connection between the formwork shell element and the carrier element since a force-fitted connection can be established and separated again in a simple manner in the normal direction to the formwork shell. However, for transmitting larger forces, form-closed designed connecting elements are also suitable. It is also possible to provide connectors which function both force-fitted and form-closed.

In an advantageous embodiment, it is contemplated that the carrier element and/or the formwork shell element have elastically deformable portions. In this embodiment, the carrier element and/or the formwork shell element are configured so that they are, at least in sections, elastically resilient. Such an implementation enables a design of a connector which functions both form-closed and force-fitted. Elastically deformable sections may be either located on the formwork shell element, on the carrier element, or on both of these elements.

In one embodiment, it is contemplated that the formwork shell element has a shaft and a connector head, wherein the formwork shell element is connected to the formwork shell at one end of the shaft, and the connector head is connected to the end of the shaft located opposite of the formwork shell. In this embodiment, the formwork shell element has a connector head which is provided to establish an effective connection to the carrier element. This effective connection can be form-closed, force-fitted, or configured according to a combination of these two operating principles. Adjacent to the connector head, a shaft is provided which is, for example, configured in a rod-shape. One end of this shaft is connected to the connector head, the opposite end of the shaft is connected to the formwork shell.

Favourably, it is contemplated that the connector head has at least one bending portion which is elastically deformable relative to the shaft. In this embodiment, the connector head of the formwork shell element has at least one elastically deformable section, a bending portion. This bending portion is configured so that it is elastically deformable relative to the shaft. The bending portion is thus also configured so that it is movable relative to the shaft and to the formwork shell.

Furthermore, it is contemplated that the bending portion has at least one insertion surface and at least one separation surface, wherein, when the formwork shell element is connected to the carrier element, the insertion surface, at least in sections, abuts on the carrier element, and, when the connection of the formwork shell element to the carrier element is released, the separation surface, at least in sections, abuts on the carrier element. In this embodiment, the elastic bending portion has at least one insertion surface and at least one separation surface. These two surfaces are provided for establishing an effective connection to the carrier element when the formwork shell element and the carrier element are connected or separated. For establishing the connection, at least part the insertion surface of the formwork shell element abuts on the carrier element. When a force in the normal direction to the formwork shell is applied to the formwork shell element in this state, the insertion surface is pressed against the carrier element. With this pressing force on the insertion surface, an elastic deformation of the bending portion can be initiated, which in turn leads to the formwork shell element being compressed in its radial direction. In this way, the insertion into the carrier element is facilitated. When a connector is to be separated by pulling the formwork shell element out of the carrier element the separation surface of the formwork shell element, at least in sections, abuts on the carrier element. Thus, by applying a pulling force in the normal direction to the formwork shell, a pressing force is applied to the separation surface, which in turn results in a radial, elastic deformation of the bending portion. In this radially compressed state, the formwork shell element can then be pulled out of the carrier element more easily.

Skillfully, it is contemplated that the insertion surface and the separation surface are positioned at an angle, particularly at different angles, to the central axis of the shaft. The central axis of the shaft of the formwork shell element is oriented orthogonal to the concrete side of the of formwork shell. The formwork shell element protrudes beyond the formwork shell in the direction of the central axis of the shaft on the mounting side. Favourably, the insertion surface and the separation surface are aligned at an angle to the central axis of the shaft. When connecting and separating the formwork shell element and the carrier element, the two elements are moved relative to each other along the central axis of the shaft. The insertion surface and the separation surface are therefore oriented at an angle to the direction of movement when connecting and separating the connector. During the abutment between the insertion surface and the carrier element or the separation surface and the carrier element described above, these surfaces act as ramps or inclined planes which translate a force applied in the direction of movement into a force acting on the bending portion in the radial direction. Therefore, when a force in the normal direction to the formwork shell is applied to the formwork shell element, the insertion surface and the separation surface cause the bending portion to be elastically deformed in the radial direction so that connecting or a separating the connector is facilitated. The translation ratio of the axially applied force to a radially acting deformation force can be set by means of the magnitude of the angles at which the insertion surface and the separation surface are oriented relative to the central axis of the shaft and thus to the direction of movement. The radial force resulting in an elastic deformation of the bending portion is directly correlated with the threshold separation force and the threshold connecting force of the connector. Due to the fact that the angles of the insertion surface and the separation surface relative to central axis of the shaft are differently set the magnitude of the threshold separation force can be set so that it differs from the magnitude of the threshold connecting force of the connector.

In an advantageous embodiment, it is contemplated that two or a plurality of bending portions are provided which are located regular to each other relative to the central axis of the shaft, and that there is a cavity between the bending portions. In this embodiment, for example, a plurality of bending portions is provided which are located opposite to each other relative to the central axis of the shaft. In this way, a symmetrical design and/or a symmetrical radial deformation behaviour of the formwork shell element are achieved. Such a symmetrical behaviour is advantageous during the combination with the carrier element since, due to the symmetrical design, no transverse forces are generated during connection, and the formwork shell element and the carrier element can therefore be inserted into each other and connected without interference. Favourably, a cavity receiving the bending elements in the elastically deformed state is provided between the bending portions. The size of cavity may be configured so that the bending portions will not contact each other in any state of deformation. Alternatively, the cavity may also be dimensioned so that the bending portions abut on each other after a certain elastic deformation which renders any further elastic deformation impossible.

In an advantageous embodiment, it is contemplated that the carrier element is configured so that it is rigid and has a cavity substantially corresponding to the shape and size of the connector head, and that the carrier element has an insertion recess connecting an outer surface of the carrier element to the cavity, the inner diameter of the insertion recess being smaller than the largest inner diameter of the cavity. In this embodiment, the carrier element as the counterpart of the embodiments of a formwork shell element described above has a rigid configuration. In addition, the carrier element comprises a cavity provided for accommodating the connector head of the formwork shell element when the connector is connected. To this end, the shape and size of the cavity substantially correspond to the connector head. The cavity may, for example, be configured as a negative shape of the shape of the connector head. The cavity is located within the carrier element and accessible from the outside of the carrier element through an insertion recess. Here, the clear width or inner diameter of the insertion recess is smaller than the largest inner diameter of the cavity. Therefore, the cavity has an undercut opposite to the insertion recess which can be used for a form-closed connection of the formwork shell element to the carrier element. For such a form-closed connection, the connector head of the formwork shell element protrudes beyond its shaft. This protruding portion, in combination with the undercut of the cavity opposite of the insertion recess, can be paired to obtain a form-closed connection. In a simple embodiment, the insertion recess has a circular cross section. The insertion recess further comprises a central axis which is favourably aligned coaxial to the central axis of the cavity. When the connection between the formwork shell element and the carrier element is established the central axis of the insertion recess and the central axis of the shaft extend congruently.

Furthermore, it is contemplated that the insertion recess has at least one bushing insertion surface on its side facing the outer surface of the carrier element, and at least one bushing separation surface on its side facing the cavity, wherein the bushing insertion surface and the bushing separation surface are positioned at an angle, particularly at different angles, to the central axis of the insertion recess. In this embodiment, the carrier element, analogous to the formwork shell element described above comprising the connector head and the shaft, has two functional surfaces which are provided for contacting the formwork shell element: A bushing insertion surface is provided on the side of the insertion recess which intersects an outer surface of the carrier element. Correspondingly, a bushing separation surface is provided on the side of the insertion recess which opens into the cavity. The bushing insertion surface and the bushing separation surface are oriented at angles relative to the central axis of the insertion recess. When the formwork shell element is connected to the carrier element, the bushing insertion surface first contacts the formwork shell element. Due to the angled arrangement of the bushing insertion surface, the formwork shell element pushed in in the direction of the central axis of the insertion recess is compressed in its radial direction and can be inserted into the carrier element more easily. In the reverse direction, when the connection between the formwork shell element and the carrier element is separated, the bushing separation surface radially compresses the formwork shell element in case of a movement or a force along the central axis of the insertion recess and thereby facilitates the removal of the formwork shell element from the carrier element. The threshold connecting force and the threshold separation force can be set with the aid of the angles at which the bushing insertion surface and the bushing separation surface are oriented relative to central axis of the insertion recess. Here, the angles of the bushing insertion surface and the bushing separation surface may have the same or different magnitudes relative to the central axis of the insertion recess.

In the embodiments described above, the formwork shell element comprising the connector head and the shaft was described in which the connector head has elastically deformable bending portions. The carrier element was described as rigid with a cavity for accommodating the connector head. Of course, these forms may also reversed, and a rigid element having a cavity as the formwork shell element may be disposed on the side of the of the formwork shell, and a carrier element comprising an, in sections, elastically deformable connector head may be disposed on the side of the formwork carrier. All of the functionalities and advantages described above also apply to the functional and/or form reversal among the formwork shell and the formwork carrier. Moreover, it is of course also possible to provide an element with a connector head having a rigid configuration and a shaft, and to provide the opposing element with elastic bending portions and to design it with a cavity. The arrangement of elastically deformable portions on the side of the connection on which a cavity exists is thus also possible. Finally, elastically deformable bending portions may also be disposed on both sides of the connection or the connector, namely on the formwork shell element and on the carrier element.

Furthermore, it is advantageously contemplated that the formwork shell attachment portion comprises a male thread which is connected to a female thread located in the formwork shell. In this embodiment, the formwork shell element is configured so that it is detachable from the formwork shell in a particularly easy manner by a threaded connection. Alternatively, a press fit, an adhesive connection, a snap connection, or another connection may also be provided instead of such a threaded connection.

In another embodiment, it is contemplated that the carrier attachment portion comprises a male thread which is connected to a female thread located in the formwork carrier. In this embodiment, analogous to the embodiment described above, the carrier element is connected to the formwork carrier by a threaded connection. Therefore, the carrier element can be detached from the formwork carrier in a particularly easy manner. For this connection as well, alternative connections such as, for example, a press fit may be selected.

It may be contemplated that the carrier element has a carrier attachment portion which is connected to the formwork carrier, and that the connection between the carrier element and the formwork carrier is configured to be detachable. In this embodiment, a carrier attachment portion with the aid of which the connection to formwork carrier is established is provided on the carrier element. Here, this carrier attachment portion is configured so that it can be connected to the formwork carrier and detached therefrom in a destruction-free manner. In this way, the carrier element can be easily and quickly replaced.

According to the invention, it is contemplated that a formwork shell adapter is arranged between the formwork shell element and the formwork shell and/or that a carrier adapter is arranged between the carrier element and the formwork carrier. In this embodiment, another component which additionally facilitates detaching and connecting the connecting elements from and to the formwork shell and the formwork carrier is provided between the formwork shell element and the formwork shell and/or between the carrier element and the formwork carrier. A formwork shell adapter may, for example, be configured as a ring-shaped component which has a self-tapping thread on its outer circumference by means of which the formwork shell adapter can be fixedly connected to the formwork shell typically made of a wood material. In addition, the ring-shaped formwork shell adapter has a female thread on its inner circumference which is provided for the releasable connection to the formwork shell element. When the formwork shell element is exchanged, the formwork shell adapter remains connected to the formwork shell, only the formwork shell element to be replaced is separated from the formwork shell or the formwork shell adapter. Then, a new formwork shell element can be connected to the formwork shell adapter in a simple manner. Analogously, a carrier adapter serves as an interface for connecting the formwork carrier to the carrier element. For example, a carrier adapter may also be designed in a ring shape and welded to the frame of the formwork carrier on its outer circumference or a face. On its inner circumference, a carrier adapter designed in this way may also have a female thread for the connection to the carrier element. Of course, both the formwork shell adapter and the carrier adapter may also be connected to the formwork shell or the formwork carrier in an alternative manner, for example by screw connections, press fit connections, or the like.

In one embodiment, it is contemplated that the carrier element is configured so that it is rigid and has a gripping portion which substantially corresponds to the shape and size of a bending recess in the connector head adjacent to a bending portion, wherein the gripping portion protrudes beyond adjoining sections of the carrier element adjacent to it. In this embodiment, a rigid carrier element is provided, that means a carrier element which is not deformable under normal duty. On this carrier element, a protruding gripping portion is disposed which may be configured to be, for example, cylindrical, barrel-shaped, or rounded. This gripping portion is provided for being, at least in sections, encompassed by the connector head of the formwork shell element when the connector is connected. When this connection is established, the gripping portion penetrates a bending recess in the connector head. The bending recess is disposed adjacent to at least one bending portion of the connector head. In a case in which a plurality of bending portions is disposed on the connector, the bending recess is situated between these bending portions. When the connection is established the gripping portion penetrates the bending recess and elastically bends the bending portion to the outside so that it encompasses the gripping portion. The shape and size of the bending recess substantially corresponds to the shape and size of the gripping portion. This means that the bending recess, in the state connected to the gripping portion, i.e., with the bending portions elastically deformed, corresponds to the shape of the gripping portion. In the disconnected state, the volume of the bending recess is smaller than the volume of the gripping portion since the bending portions are not elastically deformed to the outside. For establishing a connection, the bending portions are elastically deformed in a direction radially away from the central axis of the formwork shell element and develop a return force directed radially inwards in the process. In this way, both a force-fitted connection and a form-closed connection are established between the two sections. Here, the connection is configured so that it can be reversibly released again by applying a normal force perpendicular to the surface of the formwork shell. For establishing the connection between the gripping portion and the bending recess, a threshold connecting force has to be applied, for separating this connection, a threshold separation force has to be applied.

Furthermore, it is contemplated that the carrier element has a bending portion accommodation at least partly enclosing the gripping portion adjacent to the gripping portion, and that the bending portion accommodation at least partly accommodates the bending portion of the formwork shell element when the connector is connected. In this embodiment, the gripping portion of the carrier element is enclosed by a bending portion accommodation which, in the state connected to the formwork shell element, accommodates at least a section of the bending portion. In this way, the bending portion elastically deformed when connected is accommodated inside the carrier element and thereby protected from environmental influences and contamination. Here, the inner dimensions of the bending portion accommodation are kept larger than the outer dimensions of the bending portion in the deformed state.

In another embodiment, it is contemplated that the carrier element has a guiding portion at least partly encompassing and defining the bending portion accommodation on the side of the bending portion accommodation facing away from the gripping portion, the guiding portion providing an outer surface of the carrier element facing away from the gripping element which is provided as a guiding surface of the carrier element to the formwork carrier. In this embodiment, the bending portion accommodation is defined by a guiding portion on its side facing away from the gripping portion. On the one hand, this guiding portion forms a boundary of the bending portion accommodation and, on the other hand, a boundary of the carrier element to the outside. On the outer circumferential surface of the guiding portion which also forms an outer circumferential surface of the carrier element, an outer surface is provided which is preferably oriented substantially parallel to the central axis of the gripping portion. During the installation of the carrier element on the formwork carrier, this outer surface serves as a guiding surface of the carrier element relative to the formwork carrier. The carrier element is either disposed directly on the frame of the formwork carrier or on or in an additional support panel which is in contact with the frame. Correspondingly, the outer surface of the guiding portion is disposed adjacent to either the frame or a support panel of the formwork carrier.

Furthermore, it is contemplated that the carrier element comprises an, at least in sections, planar bottom portion which is oriented substantially perpendicular to the central axis of the gripping portion, and that the bottom portion abuts on a support panel or the frame of the formwork carrier in a planar manner. In this embodiment, the carrier element comprises a bottom portion provided as an abutment surface of the carrier element on the formwork carrier. At the same time, the bottom portion connects the gripping portion to the guiding portion and defines the bending portion accommodation. The bottom portion has a bottom surface oriented away from the gripping element which is, at least in sections, configured to be planar. This bottom surface abuts on the formwork carrier when a carrier element is connected to the formwork carrier. Here, the bottom surface is preferably configured so that it is planar over a large area to obtain a large abutment surface of the carrier element and the formwork carrier.

Optionally, it is contemplated that the carrier element has an attachment portion at least partly disposed in the gripping portion, wherein the attachment portion is provided for fastening the carrier element to the frame or to a support panel, wherein, particularly, the attachment portion comprises at least one recess extending completely through the carrier element in a direction perpendicular to the mounting side. In this embodiment, the carrier element comprises at least one attachment portion at least partly disposed in the gripping portion. For example, in a plan view of the mounting side, the attachment portion may be situated within and concentric to the gripping portion. The attachment portion is provided for fastening the carrier element to the formwork carrier or to a support panel. For this purpose, the attachment portion may comprise a recess which may, for example, be configured as a simple cylindrical hole. Through this recess, a connecting element such as, for example, a screw, can be passed through the carrier element, and the carrier element can be fastened to the formwork carrier positioned below with the aid of the connecting element. In addition, the attachment portion may also have a cavity provided for accommodating the head of a connecting element such as, for example, a screw inside the gripping portion. In addition to the attachment portion, an additional connecting portion which may also be used for connecting the carrier element to the formwork carrier may be provided, particularly on the outer circumference of the guiding portion. For example, such a connecting portion may have a contact surface which is pressed into a recess in the formwork carrier whereby a force-fitted connection is established between the carrier element and the formwork carrier. Of course, a plurality of fastening portions and/or a plurality of connecting portions may also be disposed on the carrier element.

Furthermore, it is contemplated that the carrier element is inserted into a recess in a support panel, wherein the bottom portion of the carrier element abuts on a boundary surface of the recess in the support panel in a planar manner, and the carrier element is fastened, together with the support panel, to the frame of the formwork carrier by a fastening element, wherein the fastening element is passed through the attachment portion or is part of the attachment portion. In this embodiment, the carrier element is fastened to the frame of the formwork carrier together with a support panel. Here, the carrier element serves as an assist element for fastening the support panel to the frame. To this end, the carrier element abuts on the guiding panel in a planar manner on its bottom portion. The carrier element is connected to the frame and biased against it by a fastening element, for example a screw. The support panel is clamped between the carrier element and the frame and thus fixed in a force-fitted manner. Due to the large bearing surface between the bottom portion of the carrier element and the support panel, it is only insignificantly exposed to tensions. Furthermore, forces applied to the support panel are transmitted to the frame in a stress-relieved manner due to the large contact surface. In this embodiment, the carrier element fulfils a dual function. On the one hand, it is part of a connector, and, on the other hand, it has the effect of a washer which increases the contact surface between a fastening element and a support panel. Owing to this combination of functions, the formwork module is particularly robust and, at the same time, simple in design in this embodiment. Preferably, a recess substantially corresponding to the shape and size of the carrier element is provided in the support panel is this embodiment. This recess is configured so that it does not completely extend through the support panel, but so that a portion of the support panel remains. The carrier element is preferably disposed within this recess so that it does not protrude beyond the support panel. In this way, the carrier element is attached within the support panel in a protected manner.

In a favourable embodiment, it is contemplated that, in a plan view of the carrier element from a direction perpendicular to the mounting side, the gripping portion and the bending portion accommodation have a circular shape and are positioned concentrically relative to each other, wherein, particularly, the guiding portion and/or the attachment portion are also positioned concentrically to the gripping portion and to the bending portion accommodation. In this embodiment, in a plan view of the mounting side, the carrier element has a circular configuration. Moreover, at least the gripping portion and the circular ring-shaped bending portion accommodation are arranged concentrically to each other, wherein the bending portion accommodation extends around the entire gripping portion. Moreover, the guiding portion may also be arranged concentrically to the two other portions, wherein the guiding portion is disposed outside of the bending portion accommodation and completely surrounds it. Furthermore, the attachment portion may also be arranged concentrical to the other portions, wherein it is preferably situated in the centre of the gripping portion and therefore constitutes the innermost section. This concentric arrangement is advantageous in that the carrier element is designed symmetrically in the circumferential direction and can therefore be equally well combined with and connected to the formwork shell element parallel to the mounting side from all directions. Therefore, the positioning of the carrier element relative to the formwork carrier in the rotational direction about an imaginary axis perpendicular to the mounting side is irrelevant in this embodiment. Therefore, this facilitates the assembly of the formwork carrier and the carrier element.

In another embodiment, it is contemplated that the formwork carrier comprises at least one support panel which is connected to the frame, wherein the support panel is provided for establishing a connection to the formwork shell, and that at least one carrier element of at least one connector is disposed on or in the support panel. In this embodiment, the formwork carrier comprises, apart from the frame, a support panel which, like the frame, is provided for the connection to the formwork shell. The support panel enlarges the surface of the formwork carrier facing the formwork shell. Favourably, at least one connector, namely the carrier element of at least of one connector, is disposed on or in the support panel. In addition to the frame, the support panel makes a surface available on which connectors for a connection to the formwork shell can be arranged. The support panel may be made of a wood material, a plastic material, or also of metal, for example of sheet metal.

In an advantageous embodiment, it is contemplated that the support panel is configured to detachable from the frame and therefore exchangeable. The support panel can be connected to and also detached from the frame in a simple manner. In this way, it is possible to provide a frame with support panels of various designs. For example, various support panels having a different number of carrier elements attached thereto may be stored, the support panel currently required for the building part to be erected then being connected to a frame of a formwork carrier at the construction site. For example, such a separable connection of the support panel and the frame may be realised by means of screw connections. The surface of the support panel facing the formwork shell may extend parallel to the mounting side or to the concrete side of the of formwork shell.

Optionally, it is contemplated that the carrier element is connected to the frame or the support panel of the formwork carrier by a press-fit connection. In this embodiment, the carrier element is pressed into the frame or a support panel of the formwork carrier. Therefore, there is a force-fitted connection between the carrier element and the formwork carrier. Preferably, this press-fit connection is established between an outer circumferential surface of the carrier element which forms a connecting portion and an inner circumferential surface of a recess in the formwork carrier. Moreover, in addition to the press-fit connection, the support element may be connected to the formwork carrier by one or more connecting elements such as, for example, screws, rivets or the like.

Skillfully, it is contemplated that the surface of the frame facing the formwork shell is flush with the surface of the support panel facing the formwork shell. In this embodiment, the support panel is inserted into the frame. Here, the frame extends around the support panel. In order to achieve a planar and defined abutment of the formwork shell on the formwork carrier, the surface of the frame and the surface of the support panel on the side of the formwork carrier facing the formwork shell are flush with each other. Both on or in the frame and on or in the support panel, one or more carrier elements are disposed. In this embodiment, the formwork shell is connected to the formwork carrier by connectors present both in the support panel and in the frame.

In one embodiment, it is contemplated that the formwork shell element comprises a shaft and a connector head, wherein, on one end of the shaft, the formwork shell element is connected to the formwork shell, and the connector head is connected to the end of the shaft located opposite of the formwork shell, wherein the outer diameter of the connector head is larger than the outer diameter of the shaft, and the connector head therefore protrudes beyond the shaft. In this embodiment, the connector head protrudes beyond the shaft. In this way, a shoulder is formed on the formwork shell element which can be used for a form-closed connection to the carrier element. The shaft corresponds to the formwork shell attachment portion since the connection of the formwork shell element to the formwork shell is realised via the formwork shell adapter and the shaft as interfaces. Alternatively, the outer diameter of the shaft relative to the central axis of the formwork shell element may also be larger than the outer diameter of the connector head.

In another embodiment, it is contemplated that the carrier element has a cavity the inner diameter of which is larger than the outer diameter of the connector head, and the carrier element has at least one latch element which is, at least partly, disposed in the carrier element and configured to be movable relative to the cavity, wherein the latch element, in a locked state, protrudes into the cavity and reduces its clear width. In this embodiment, the formwork shell element and the carrier element are, alternatively or in addition to a force-fitted connection, also form-closed connectable to each other. To this end, at least one movable latch element is provided on the carrier element which, in the connected to state of the formwork shell element and the carrier element, can be moved relative to the formwork shell element. In the locked state of the connector, the latch element is provided for an engagement with an undercut of the formwork shell element, whereby a form-closed connection is established. The carrier element has a cavity which is dimensioned so that it can accommodate the connector head of the formwork shell element when the latch element is open. The latch element is configured so that it is movable towards this cavity. When transferred into the locked state the latch element is, at least in sections, moved into the cavity so that its clear width is reduced. For releasing the locked state, the latch element is moved out of the cavity again. The latch element may also be arranged on or in an insertion recess which connects an outer surface of the carrier element to the cavity. A plurality of latch elements which are movable relative to the cavity may be provided. In this embodiment, the connector head of the formwork shell element may be configured to be rigid. Alternatively, however, the connector head may also comprise at least one elastically deformable bending portion which interacts with the carrier element in a force-fitted manner when the formwork shell element is connected to the carrier element.

Favourably, it is contemplated that the carrier element further comprises a latch mechanism which moves the latch element relative to cavity, the latch mechanism being operable by a translational and/or rotational movement. In this embodiment, a latch mechanism serving the operation of the at least one latch element is provided. This latch mechanism translates a movement generated and introduced from outside of the carrier element into a movement of the latch element. Since locking and unlocking the latch element is to be performable rapidly and in a simple manner the latch mechanism is, in particular, designed so that it is operable by a simple translational or rotational movement. A combination of these two types of movement is also feasible. The movement for operating the latch mechanism is performed by a person connecting or separating the formwork shell and the formwork carrier to or from each other.

Furthermore, it is contemplated that the latch mechanism is accessible from a side of the formwork carrier facing away from the formwork shell, wherein, in particular, the latch mechanism is accessible from the surface of the formwork carrier located opposite of the formwork shell or from a surface of the formwork carrier oriented orthogonal to the formwork shell. In this embodiment, a latch mechanism is provided which is accessible from the side of the of formwork shell facing away from the concrete side and is also operated from this side. After the concrete material has been filled into the formwork the concrete side is no longer accessible. By arranging the latch mechanism on the side of the of formwork shell facing away from the building part to be erected it is possible to separate the formwork shell from the formwork carrier in the state in which the formwork is in place. Therefore, first, the formwork carrier can be removed, and then the formwork shell can be taken off the erected building part when the formwork is removed. Here, the elements of the latch mechanism to be operated for moving the latch element may be arranged on the side of the formwork carrier facing away from the formwork shell. Alternatively, particularly when the carrier element is arranged on a frame of the formwork carrier, these elements required for operating the latch mechanism may also be disposed on a side surface of the frame which is positioned orthogonal or at another angle to the mounting side of the formwork shell.

As an alternative to the embodiments described above in which at least one latch element is disposed on the carrier element of the connector, it is of course also possible to dispose at least one latch element on the formwork shell element. For the embodiments of a connector described above which functions, at least partly, in a form-closed manner, the forms and functions described above for the carrier element may of course also be used or considered for the formwork shell element. The same applies in the reverse: features, forms and functions described in connection with the formwork shell element may also be used for the carrier element.

In one embodiment, it is contemplated that the carrier element comprises a shaft and a connector head, and that the formwork shell element comprises an at least partly undercut cavity, and that the formwork shell element is positioned in the formwork shell so that it is rotatable and axially fixed, wherein the cavity can be brought into a form-closed connection to the connector head, wherein this form-closed connection can be established by a rotating movement of the formwork shell element, and is configured to be detachable, wherein the formwork shell element is accessible from the concrete side of the of formwork shell, and that, on the formwork shell element, a key section is provided for applying a torque to the formwork shell element, wherein, particularly, the formwork shell element is covered by a cover on the concrete side. In this embodiment, an at least partly form-closed effective connector is accessible and operable from the concrete side of the of formwork shell. In some applications, when erecting building parts, the side of the formwork carrier facing away from the formwork shell is not accessible. In this case, potentially, existing locking mechanisms on the side of the formwork carrier facing away from the formwork shell are not accessible. In this case, an operability of a form-closed functioning connector from the side located opposite, namely from the side of the of formwork shell, has to be rendered possible. A solution for this application is arranging the formwork shell element in the formwork shell so that it is rotatable but axially fixed. This rotatably supported formwork shell element form-closed interacts with a carrier element disposed on the formwork carrier. For this purpose, the carrier element comprises a connector head protruding beyond a shaft which may optionally be enclosed by a partly undercut cavity disposed on the formwork shell element here. The carrier element and the partly undercut, rotatably supported cavity of the formwork shell element are insertable into each other in a radial posture of the formwork shell element. When, after the insertion, the formwork shell element is rotated, the partly provided undercut of the cavity engages the connector head of the carrier element. In this way, a form-closed connection between two elements is established. In this embodiment, the described rotational movement of the formwork shell element is induced in the formwork shell element from the concrete side of the of formwork shell. For this purpose, a latch mechanism oriented in the direction of the concrete side is provided. This latch mechanism may, for example, comprise a key section, which is accessible and operable from the concrete side. For connecting and separating the formwork shell element and the carrier element, the key section facing the concrete side may be operated by a person, either by hand or with a simple tool. For enabling a flat surface of the building part to be erected, the access to the formwork shell element from the concrete side of the of formwork shell, and particularly the access to the key section, is covered by a cover which can be simply removed. When erecting the building part to be erected, therefore, the access to the formwork shell element is closed by the cover so that a smooth surface of the building part will be formed. For separating the formwork shell from the formwork carrier, the cover is then removed, and the key section is accessible. For example, the cover may be formed by a plastic or rubber cap having a planar design on the concrete side.

In an alternative embodiment, it is contemplated that a plurality of formwork shell elements is disposed on the mounting side of the formwork shell and a plurality of carrier elements is disposed on the side of the formwork carrier facing the formwork shell and that therefore a plurality of connectors are provided, wherein the connectors are regularly distributed across the formwork shell and the formwork carrier. In this embodiment, a plurality of connectors is situated between the formwork shell and the formwork carrier. These connectors have a constant distance to each other, respectively, and are therefore regularly distributed. In this embodiment, the number of connectors per surface area is constant across the entire formwork module.

In a preferred implementation, it is contemplated that the frame has a guide rail which protrudes beyond the surface of the frame facing the formwork shell and which, at least partly, extends around the frame on its side facing the formwork shell. In this embodiment, the edge of the frame facing outwards is defined by a guide rail. This guide rail protrudes beyond the remaining surface of the frame facing the formwork shell. The guide rail serves to easily and securely position the formwork shell relative to the formwork carrier or to the frame. The guide rail may be disposed on the outer edge of the frame, either in sections or extending completely around it. Favourably, the guide rail is integrated in the elements forming the frame. Alternatively, however, the guide rail may also be by formed as a component attached to the remaining frame, the guide rail being connected to the remaining frame by screw connections, welded joints or the like.

Furthermore, it is contemplated that an edge element which extends, at least partly, around the formwork shell is attached to the edges of the formwork shell, the edge element being formed of an elastically deformable material. In this embodiment, the edges located on the outer circumference of the formwork shell are provided with an edge element. On the one hand, this edge element serves the mechanical protection of the edges from damage during the transport of the formwork shell. Moreover, the edge element is provided as a seal of the formwork shell with respect to the formwork carrier or of a formwork shell with respect to an adjacent formwork shell. To this end, favourably, the edge element is made of an elastically deformable material so that the shape of the edge element is elastically changeable in a simple manner for sealing it with respect to another element. An embodiment in which the edge element extends around the entire circumference the formwork shell facing outwards is most suitable for a secure seal. Alternatively, an edge element may also be arranged only in sections of the outer circumference of the formwork shell. The edge element may be flush with the concrete side and/or the mounting side in the thickness direction, i.e., in the direction extending between the concrete side and the mounting side of the formwork shell. Alternatively, the edge element may protrude beyond the formwork shell on its concrete side and/or on its mounting side.

Furthermore, it is, favourably, contemplated that the formwork shell has a shoulder at least partly extending around the mounting side on its edge on the mounting side, the shoulder having a shape which is complementary to the guide rail of the frame. In this embodiment, the formwork shell is configured so that it is asymmetrical in its thickness direction. On the mounting side, a shoulder is situated which is adapted to a guide rail of the formwork carrier in its size and shape. Therefore, the guide rail of the frame of the carrier element is received in the shoulder on the mounting side of the formwork shell when the formwork shell is connected to the formwork carrier. With respect to each other, the guide rail and the shoulder are positioned and dimensioned so that a clearance fit exists between the two geometric elements and that the formwork shell can therefore be easily connected to the formwork carrier. Due to the interaction of the shoulder and the guide rail, a form-closed connection between the formwork shell and the formwork carrier is established so that the two elements can be more easily positioned relative to each other and are fixed relative to each other after they have been positioned. This is particularly advantageous to also correctly position the connectors disposed between the formwork shell and the formwork carrier relative to each other.

In an advantageous embodiment, it is contemplated that the edge element protrudes beyond the frame in at least one direction parallel to the concrete side when the formwork shell is connected to the formwork carrier. In this embodiment, the edge element which is configured to be elastically deformable protrudes beyond the formwork module in the circumferential direction. Owing to this projection, adjacent formwork modules arranged in a formwork can be sealed with respect to each other against concrete material leaking out during the casting process. For this purpose, the formwork modules arranged adjacent to each other are positioned so that their distance is smaller than as the sum of the projection of the undeformed edge elements beyond the frame. During the attachment of the formwork shells to the formwork carrier, the two edge elements on the outer circumference of adjacent formwork shells are elastically deformed. Owing to this elastic deformation, the surfaces of the edge elements adapt to each other so that the area on which the adjacent formwork modules contact each other is excellently sealed.

Also disclosed is a formwork module for a formwork for a building part comprising at least one formwork carrier, and at least one formwork shell, wherein at least one connector is disposed between the formwork carrier and the formwork shell, and the connector comprises at least one formwork shell element which is fastened in or on the formwork shell, and the formwork shell element is connected to the formwork carrier, particularly to a recess in the formwork carrier;

and the formwork carrier and the formwork shell element can be reversibly interconnected and form the connector by means of which the formwork shell can be reversibly connected to the formwork carrier, wherein the reversible connection between formwork carrier and formwork shell element is connectable by applying a force in the normal direction to the formwork shell directed towards the formwork carrier which is larger than a threshold connecting force, and wherein the reversible connection between formwork carrier and formwork shell element is separable by an elastic deformation of a section of the formwork shell element by means of a separating tool, wherein the formwork shell element comprises a formwork shell attachment portion which is connected to the formwork shell, and the connection between the formwork shell element and the formwork shell is configured to be detachable, wherein a formwork shell adapter is disposed between the formwork shell element and the formwork shell, wherein the formwork shell adapter is a component which facilitates detaching and connecting the formwork shell element from/to the formwork shell, and the formwork shell adapter remains on or in the formwork shell when the formwork shell element is exchanged.

This alternative formwork module differs from the formwork module described above in a plurality of embodiments in that a separation of the formwork shell and the formwork carrier cannot be performed by applying a normal force directed away from the formwork carrier to the formwork shell alone. The alternative formwork module comprises a connector which is deformable by a separating tool so that a form-closed connection between the formwork shell element and the carrier element is released by this deformation. By releasing this form-closed connection, the formwork shell and the formwork carrier are then separable from each other. For the elements which are identical to the formwork shell element according to the invention described above reference is made to the associated description. In the alternative formwork module, a reversible connection between the formwork shell comprising a formwork shell element disposed thereon and the carrier element can be established by applying a normal force which is larger than a threshold connecting force to the formwork shell. When this threshold connecting force is exceeded, a form-closed connection is then established between the formwork shell element and the formwork carrier which keeps the formwork shell and the formwork carrier together. When the formwork shell is to be detached from the formwork carrier a separating tool is used which is brought in contact with a section of the formwork shell element to deform it. Due to this deformation, the form-closed connection between the formwork shell element and the carrier element is released, and the formwork shell can be removed from the carrier element without the formwork shell element being destroyed in the process. This alternative formwork module is advantageous in that the formwork shell element may be designed in a very simple and robust manner. Moreover, a carrier element is not essentially required here.

In one embodiment of the alternative formwork module, it is contemplated that the formwork shell element comprises a shaft and a connector head, wherein the formwork shell element is connected to the formwork shell on one end of the shaft, and the connector head is connected to the end of the shaft located opposite of the formwork shell, and the connector head has at least one bending portion elastically deformable relative to the shaft, and the formwork carrier has at least one recess through which at least part of the connector head including the bending portion can be inserted, and a form-closed connection between the connector head and the recess in the formwork carrier is established in this way so that the reversible connection between the formwork shell and the formwork carrier can be established, and wherein the bending portion is elastically deformable by the separating tool, and this deformation can be induced by a linear movement of the separating tool in a direction perpendicular to the mounting side from the formwork carrier to the formwork shell, wherein the form-closed connection between the connector head and the recess in the formwork carrier is released by this elastic deformation of the bending portion, and the connector head can be removed from the recess in the formwork carrier. In this embodiment, analogous to the embodiment of the formwork module according to the invention described above, a connector head having at least one elastically formable bending portion is provided. When establishing the connection, this connector head is inserted into a recess in the formwork carrier, whereby a form-closed connection is established. For separating the formwork shell and the formwork carrier, this form-closed connection can be released by a linear movement of a separating tool relative to the formwork shell element and its connector head. Here, the separating tool elastically deforms at least one bending portion. The bending portion is not damaged thereby and can be used for a renewed connection of a formwork shell to a formwork carrier.

Furthermore, it is contemplated that, in the alternative formwork module, the separating tool has a recess having an, at least in sections, cylindrically formed cross section, and the bending portion has a tool engagement surface inclined towards the mounting side relative to the normal direction, wherein the recess in the separating tool can be brought into contact with the tool engagement surface on its peripheral portion, and, in case of a linear movement of the separating tool towards the formwork element, the bending portion is elastically deformable in direction of the interior of the recess in the separating tool. In this embodiment, the separating tool has a recess in its interior which is partly passed over the bending portion for separating the connection between the formwork shell and the formwork carrier. In the process, a peripheral portion of this recess abuts on a tool engagement surface of the bending portion. With another linear advance movement of the separating tool in a direction perpendicular to the mounting side, the separating tool elastically deforms the bending portion so that the form-closed connection between the formwork shell element and the carrier element is released. In this embodiment, the separating tool has a very simple design and may be formed, for example, by a simple pipe section. Moreover, the handling of the separating tool is simple so that a separation of the formwork shell and the formwork carrier can be performed in a simple manner.

The object the invention is also solved by the use of a connector for detachably connecting a formwork carrier to a formwork shell. A connector consists of a formwork shell element and a carrier element according to one of the embodiments of a formwork module according to the invention described above. The use of a connector for connecting a formwork shell to a formwork carrier results in an easy connection and an easy separation of these two elements to or from each other. Since the connectors are configured so that they are reversibly connectable to each other and separable from each other, particularly in a destruction-free and low-wear manner, the use of a connector renders the repeated, destruction-free connecting and separating of the formwork shell and the formwork carrier possible. The advantages described above in connection with the embodiments of the formwork module apply analogously also to the use of a connector for detachably connecting a formwork carrier to a formwork shell.

Furthermore, the object the invention is solved by a method for connecting a formwork shell to a formwork carrier of a formwork module according to one of the embodiments described above comprising the steps a) positioning the formwork shell relative to the formwork carrier, wherein the at least one formwork shell element is aligned in axial alignment with the at least one carrier element,
b) applying a normal force in the direction of the formwork carrier to the formwork shell, wherein the normal force is larger than the sum of the threshold connecting force of all connectors between the formwork shell and the formwork carrier,
c) moving the formwork shell towards the formwork carrier in the normal direction to the formwork shell until the formwork shell abuts on auf the formwork carrier in a planar manner.

A method according to the invention serves the reversible, i.e., releasable and repeatable connection a formwork shell to a formwork carrier of a formwork module. The method according to the invention is, particularly, performed exactly in the described order of the steps a) to c). In a first step a), the formwork shell is positioned relative to the formwork carrier. This positioning is performed so that the formwork shell element is oriented in axial alignment with the carrier element. When a plurality of connectors is provided the formwork shell is positioned so that all formwork shell elements are oriented in axial alignment with the associated carrier elements. Here, axial alignment is to be understood to mean that the formwork shell element and the carrier element are aligned relative to each other so that the two elements can be connected to each other. Favourably, the formwork shell element and the carrier element are configured so that an offset of their central axes of a few millimetres can be compensated. The formwork shell element and the carrier element are configured so that connecting the two elements is guided, for example, by insertion slopes catching the formwork shell element when the connection is established being provided on the carrier element. Therefore, the formwork shell element and the carrier element do not need to be aligned so that they are in precise axial alignment. This tolerance in the positioning of the formwork shell relative to the carrier element facilitates a fast and easy connection.

In a second step b), a normal force substantially acting at right angles to the concrete side of the of formwork shell is applied to the formwork shell previously positioned. This normal force acts from the formwork shell in the direction of the formwork carrier. Therefore, the formwork shell is pushed against the formwork carrier. The normal force has a magnitude which is larger than the sum of the threshold connecting force of all connectors of the formwork module.

By overcoming these summed-up threshold connecting forces, the connectors can be connected to each other in the next step.

After the threshold connecting force is overcome, in a further step c), the formwork shell is moved to the formwork carrier until the formwork shell abuts on the formwork carrier in a planar manner. In this step, the formwork element is connected to the carrier element. In the end of step c), the formwork shell is fixedly attached to the formwork carrier. When then, during the erection of a building part, a concrete material is filled into the formwork the pressure forces applied to the formwork shell by the concrete material are introduced into the formwork carrier by the abutment of the formwork shell on formwork carrier. The connector or the connectors are not or only to a very small extent affected by pressure forces resulting from the concrete material. A method according to the invention is advantageous in that it can be performed rapidly and easily. The formwork shell is positioned relative to the formwork carrier and pushed onto it. The necessity of a tool for establishing the connection and elaborate securing steps are completely omitted. Moreover, in a method according to the invention for establishing a connection, no damage such as, for example, the damage caused in case of a conventional rivet connection between the two elements is caused to the formwork shell or the formwork carrier.

In one embodiment of the method, it is contemplated that, prior to the positioning a), a support panel is connected to the frame of the formwork carrier. In this embodiment, a support panel is fastened to the frame or the formwork carrier before the formwork shell is attached to it. As described above in connection with a formwork module, such a support panel serves the improvement of the rigidity of the formwork carrier and particularly also the provision of a larger bearing surface which can be used for the attachment of a higher number of connectors. For example, the support panel may be connected to the frame by means of screw connections. It is also possible to attach a plurality of support panels to the frame and to select these support panels in accordance with the requirements to be expected when a building part is erected.

In another embodiment, it is contemplated that the formwork module comprises a plurality of connectors at least part of which comprises a latch mechanism and a latch element, and that, following the movement c) of the formwork shell until it abuts on the formwork carrier, step d) operating the latch mechanism and closing the latch element of the connectors having a latch element is performed. In this embodiment, the formwork module comprises a plurality of connectors at least one of which comprises a latch element for establishing a form-closed connection. The operating principle of such a latch element is described in connection with the formwork module. In this embodiment of the method, first, the steps a) to c) are performed until the formwork shell abuts on the formwork carrier in a planar manner. In a further step d), now, in the connector or the connectors comprising a latch element, this latch element is closed, and, in this way, a form-closed connection is established between the formwork shell element and the carrier element. For transferring the latch element into the locked state, the latch mechanism is operated. By providing one or more connectors having a latch element, the sum of the threshold separation forces of the formwork shell and the formwork carrier can be increased. Favourably, connectors having a latch element are disposed in the edge or corner area of the formwork module.

Optionally, it is contemplated that, prior to applying b) the normal force to the formwork shell, a viscous connecting agent, particularly an adhesive, is applied in at least sections of the peripheral portion and/or at the edges of the formwork shell and the formwork carrier, and that the viscous bonding agent hardens after the movement c) of the formwork shell to the formwork carrier and forms a material connection between the formwork shell and the formwork carrier. In this embodiment of a method, the connection of the formwork shell and the formwork carrier is reinforced by providing a material connection effective in addition to the connector. For this purpose, a viscous connecting agent, for example an adhesive, is applied to at least sections prior to the positioning a) or prior to the application b) of the normal force to the formwork shell. This viscous connecting agent may be applied to the formwork shell and/or to the formwork carrier. This application may, for example, be achieved by an application with a brush, by spraying, or by squeezing out of a cartridge. After this application of the connecting agent, the formwork shell and the formwork carrier are connected to each other according to step c). By applying pressure, the connecting agent is distributed between the formwork shell and the formwork carrier in a planar manner. After the application of pressure, the connecting agent hardens and then forms a material connection between the formwork shell and the formwork carrier. This material connection is not reversible when the formwork shell and the formwork carrier are separated, i.e., the material connection is destroyed upon separation.

In another embodiment, it is contemplated that, prior to positioning a) the formwork shell relative to the formwork carrier, at least one formwork shell element is connected to a formwork shell adapter and/or at least one carrier element is connected to a carrier adapter. In this embodiment, a formwork shell adapter is disposed on the formwork shell and/or a carrier adapter is disposed on the formwork carrier to facilitate an exchange of the formwork shell element or the carrier element. Prior to positioning a), all existing formwork shell elements and carrier elements are inspected. If increased wear or damage is found on one or more of these elements, these elements are simply exchanged. Here, the formwork shell adapter and the carrier adapter facilitate this replacement. However, when a so far unused carrier element or a so far unused formwork shell is used, initially, the corresponding connecting elements are attached.

Also disclosed is a method for separating a formwork shell from a formwork carrier of a formwork module comprising the steps I) applying a normal force in a direction directed away from the formwork carrier to the formwork shell, the normal force being larger than the sum of the threshold separation force of all connectors between the formwork shell and the formwork carrier, II) removing the formwork shell from the formwork carrier. This method according to the invention is provided for separating a formwork shell from a formwork carrier according to one of the embodiments of a formwork module described above. This method may be combined, particularly performed in alternation with the method for connecting the formwork shell to the formwork carrier described above. In particular, the method for separating the formwork shell from the formwork carrier is performed in the described order of the steps I) to II). The separation of the formwork shell and the formwork carrier is typically performed after the removal of the formwork module from the formwork after the erection of a building part.

In a first step, a normal force acting away from the formwork carrier is applied to the formwork shell. This normal force required for the separation is larger than the sum the threshold separation forces of all connectors disposed between the formwork shell and the formwork carrier. For applying this normal force, for example, the formwork shell may be pulled away from the formwork carrier. Alternatively, a pressing force directed away from the formwork carrier can be applied to the formwork shell from the side of the formwork carrier facing away from the formwork shell. After the sum of the threshold separation forces is exceeded, the released formwork shell is removed from the formwork carrier in a second step II).

In one embodiment of the method, it is contemplated that the formwork module comprises a plurality of connectors at least part of which comprise a latch mechanism and a latch element, and that, prior to the application I) of the normal force to the formwork shell, a step I*a*) of operating the latch mechanism and opening the latch element of the connectors having a latch element is performed. In this embodiment, the formwork module comprises one or more connectors comprising a latch element for an additional form-closed connection of the formwork shell to the formwork carrier. In this embodiment, the latch element is transferred from the locked state into an opened state prior to performing the steps I) and II) to open or release the form-closed connection between the formwork shell element and the carrier element provided for by the latch element. For opening the latch element, the latch mechanism of the associated connector is operated. After the locked state is released, the formwork shell is released by applying a normal force and removed from the formwork carrier.

In one embodiment, it is contemplated that, after removing II) the formwork shell, the formwork shell element is removed from the formwork shell adapter or exchanged, and/or the carrier element is removed from the carrier adapter or exchanged. In this embodiment of the method, a formwork shell element and/or a carrier element is removed or exchanged after the removal II) of the formwork shell from the formwork carrier. The formwork shell element and the carrier element are detachably connected to the formwork shell or the formwork carrier. Such a connection with the aid of a formwork shell adapter and/or now of a carrier adapter which, as described above, additionally facilitate releasing and replacing the elements is particularly favourable. In this embodiment of the method, the formwork shell element and/or the carrier element are inspected and, particularly if there are signs of wear, detached and replaced after the separation of the formwork shell from the formwork carrier after the erection of a building part.

Furthermore, favourably, it is contemplated that, after the removal II) of the formwork shell from the formwork carrier, the formwork shell and/or the formwork carrier and/or the connector are cleaned. In this embodiment, part of or all elements and components of the formwork module are cleaned after the separation of the formwork shell from the formwork carrier. Particularly the movable or elastically deformable portions of the formwork shell element and/or the carrier element are cleaned at this point in time to prevent blocking potentially caused by hardening residues of the concrete material.

The features, effects and advantages described in connection with the formwork module may analogously also be applied to the use of a connector and the methods for connecting and separating the formwork shell from the formwork carrier and are therefore also deemed to be disclosed. The same applies in the reverse: the features, effects and advantages described in connection with the methods or use are also applicable to the formwork module and are considered to be also disclosed.

BRIEF DESCRIPTION OF THE DRAWINGS

In the Figures, embodiments of the invention are schematically illustrated. Here, FIG. 1 shows a schematic perspective view of a formwork shell and of a formwork carrier according to an embodiment of a formwork module according to the invention, FIG. 2 shows a schematic, perspective view of an alternative embodiment of a formwork carrier including a support panel, FIG. 3 shows a schematic, cut side view of a connector of an embodiment of a formwork module according to the invention, FIG. 4 shows a schematic, cut side view of a carrier element of an alternative embodiment of a formwork module according to the invention, FIG. 5 shows a schematic, cut side view of a connector of another embodiment of a formwork module according to the invention, FIG. 6 shows a schematic, cut side view of a connector of an alternative embodiment of a formwork module according to the invention, FIG. 7 shows a schematic, cut side view of part of an embodiment of a formwork module according to the invention including an edge element, FIG. 8 shows a schematic, perspective view of an embodiment of a formwork shell including a formwork shell adapter and a formwork shell element, FIG. 9 shows a schematic, perspective view of an embodiment of a formwork shell element, FIG. 10 shows a cut side view of an embodiment of a formwork shell including a formwork shell adapter and a formwork shell element, FIG. 11 shows a plan view and a side view of an embodiment of a formwork shell adapter, FIG. 12 shows a plan view of an embodiment of a formwork shell including a plurality of formwork shell adapters, FIG. 13 shows a schematic, perspective view of another embodiment of a carrier element and a formwork shell element, FIG. 14 shows a partly cut, schematic side view an embodiment of a connector, FIG. 15 shows a cut side view of an alternative formwork module including a separating tool which is in engagement with a formwork shell element.

In the Figures, the same elements are designated by the same reference numerals. On principle, the described features of an element described in connection with one Figure are also applicable to the other Figures. Directional information such as upper, lower, right or left refer to the described Figure and are to be logically applied to the other Figures.

DETAILED DESCRIPTION

FIG. 1 shows a schematic perspective view of a formwork shell 12 and a formwork carrier 11 according to an embodiment of a formwork module 1 according to the invention. The formwork module 1 comprises two main components which are separately illustrated in FIG. 1. These main components are, on the one hand, the formwork shell 12 illustrated on the left side and, on the other hand, the formwork carrier 11 illustrated on the right side. In the illustrated embodiment, the formwork shell 12 is configured as a panel-shaped, rectangular panel having a constant thickness. The surface of the formwork shell 12 facing rightwards in FIG. 1 and directed towards the formwork carrier 11 is the mounting side 122. The side of the of formwork shell 12 facing leftwards in FIG. 1 and disposed opposite of the mounting side 122 is the concrete side 121 which faces the concrete material when a building or of a building part is erected. In FIG. 1, it can be seen that the formwork shell 12 has a multi-layered design; here, it has a coating on the concrete side 121 which prevents the undesired adhesion of concrete material on the surface of the concrete side. On the mounting side 122 oriented in direction of the formwork carrier 11, a plurality of formwork shell elements 132 is disposed which are part of a connector 13, respectively.

Here, the formwork carrier 11 illustrated on the right side in FIG. 1 comprises a frame 111 which is formed of metal pipes having a rectangular cross section in the embodiment illustrated here. The frame 11 extends around the formwork carrier 11 here and comprises a strut extending from the top to the bottom in FIG. 1 for additional reinforcement in the centre. The formwork carrier 11 or the frame 111 may of course also be designed in a different manner. In the illustrated embodiment, the side of the formwork carrier 11 facing the formwork shell 12 has a rectangular shape. However, this shape may also be configured to be, for example, square. Likewise, the formwork carrier 11 may have an irregular shape, for example, with a lateral edge positioned at an acute angle. In the illustrated embodiment, the shape and the size of the mounting side 122 and of the side of the formwork carrier 11 facing the formwork shell are identical. Alternatively, the surface area of the formwork carrier 11 facing the formwork shell 12 may also be selected so that it is larger than the mounting side 122. For example, the formwork carrier 11 may be configured so that it has twice the size of the mounting side 122. In such a solution, two formwork shells 12 may be connected to one formwork carrier 11. Alternatively, the mounting side 122 may of course also be configured to be larger than the side of the formwork carrier 11 facing the formwork shell 12. In this embodiment, a formwork shell 12 may be connected to a plurality of formwork carriers 11. On the side of the formwork carrier 11 oriented in the direction of the formwork shell 12, a plurality of carrier elements 131 is disposed which are part of a connector 13, respectively.

Respectively one formwork shell element 132 disposed on the formwork shell 12 forms a connector 13 together with respectively one carrier element 131 disposed on the formwork carrier 11. In the embodiment in FIG. 1, the connectors 13 are regularly disposed in the area of the formwork shell 12 and the formwork carrier 11 facing backwards while they are unevenly disposed in the area facing forwards. In the rear area of the formwork shell 12, four formwork shell elements 132 are regularly attached in constant intervals. The same applies to their counterparts, namely the four rear carrier elements 131 on the formwork carrier 11. These four connectors 13 have the same configuration and the same dimensions so that they have the same features when being connected and separated. In this area of the formwork shell 12 and the formwork carrier 11 facing backwards, the number of connectors 13 provided per surface area is constant. In the centre, both in the longitudinal direction and in the width direction of the formwork shell 12, an additional formwork shell element 132 is disposed opposite of the strut of the frame 111 of the formwork carrier 11 so that, already here, no constant distances exist between the formwork shell elements 132 or the connectors 13. In practice, it has been found that, when the entire formwork module 1 is dismounted from the hardened concrete material formed with the aid of the formwork, larger adhesive forces are present on the concrete material in the peripheral portion of the formwork module 1 than in its centre. In case of a regular arrangement of connectors 13 illustrated in the rear area in FIG. 1, it may therefore occur that, during the detachment of the entire formwork module 1, the formwork shell 12 is unintentionally separated from the formwork carrier 11 in the peripheral portion since the adhesive force between the formwork shell 12 and the hardened concrete material may exceed the threshold separation force of the connector 13 here. To counteract these increased adhesive forces in the edge and corner area of the formwork shell 12, the threshold separation force per surface area may be increased as illustrated in the front part of the formwork shell 12 and the formwork carrier 11 in FIG. 1. For example, this may be achieved by arranging connectors 13 or formwork shell elements 132 of identical design in smaller distances to each other like in the corner portion of the corner of the formwork shell 12 facing the front left than in the central area of the mounting side 122. Therefore, the number of connectors 13 per surface area is larger in the corner facing the front left than in the central area of the formwork shell 12 and the formwork carrier 11. Another possibility to obtain a higher threshold separation force per surface area is the arrangement of connectors 13 each of which has larger dimensions and therefore a larger threshold separation force than connectors 13 located in the centre. In FIG. 1, such a connector 13 having larger dimensions is schematically shown in the lower left corner of the formwork shell 12 and the formwork carrier 11. Therefore, the embodiment in FIG. 1 shows various possibilities for varying the threshold separation force per surface area between the formwork shell 12 and the formwork carrier 11. In practice, formwork modules 1 with an increased threshold separation force per surface area on their edge and corners have been found to be more suitable. However, this increased threshold separation force per surface area may be achieved by identical connectors 13 positioned in a smaller distance to each other, by locally disposed connectors 13 having a higher threshold separation force, or by a combination of the two concepts. For example, connectors 13 having a higher threshold separation force may, in addition, comprise a latch element increasing the threshold separation force. Various embodiments of connectors 13 are illustrated and described in detail in FIG. 3 to FIG. 6. Another possibility for increasing the threshold separation force per surface area in the edge or corner portion of the formwork module 1 is to apply a further connecting agent, for example an adhesive, to sections between the mounting side 122 and the side of the formwork carrier 11 facing the formwork shell 12. In the positions in which such a connecting agent is applied, the threshold separation force is additionally increased in this way. However, a material connection provided for by such a connecting agent has to be destroyed when the formwork shell 12 is separated from the formwork carrier 11.

FIG. 2 shows a schematic perspective view of an alternative embodiment of a formwork carrier 11 including a support panel 112. In FIG. 2, a formwork carrier 11 having a shape similar to the embodiment in FIG. 1 can be seen. In FIG. 2, the side of the formwork carrier 11 facing the formwork shell 12 (not illustrated) is oriented upwards. On this side facing upwards, a total of six carrier elements 131 is positioned on the frame 111 of the formwork carrier 11. In contrast to the embodiment of the formwork carrier 11 shown in FIG. 1, the formwork carrier 11 in FIG. 2 comprises a support panel 112 inserted into the frame 111. The surface of the support panel 112 facing upwards is flush with the surface of the frame 111 facing upwards. Here, the frame 111 has a recess configured as shoulder adjacent to its surface oriented upwards and therefore towards the formwork shell 12. The support panel 112 abuts on this shoulder and is fastened to this shoulder, for example by screw connections. Here, two carrier elements 131 are disposed in the surface of the support panel 112 facing upwards. In the illustrated embodiment, therefore, connectors 13 are provided between the frame 111 and the formwork shell 12, and connectors 13 are provided between the support panel 112 and the formwork shell 12. The support panel 112 therefore increases the surface available for disposing connectors 13 between the formwork carrier 11 and the formwork shell 12. Furthermore, the support panel 112 inserted into the frame 111 mechanically reinforces the formwork carrier 11. As can be seen in FIG. 2, the support panel 112 does not fill the entire area within the frame 111. It is therefore possible to insert other support panels 112 or a support panel 112 having larger dimensions into the frame 111. The support panel 112 may therefore selected and connected to the frame 111 depending on the requirements applicable to the erection of a building part.

FIG. 3 shows a schematic, cut side view of a connector 13 of an embodiment of a formwork module 1 according to the invention. In FIG. 3, details of an embodiment of a connector 13 are illustrated. On the left side of FIG. 3, a cut peripheral portion of the formwork shell 12 is illustrated. In the illustration, it can be seen that the formwork shell 12 has a multi-layered configuration and comprises a coating on its concrete side 121. The formwork shell element 132 is located on the mounting side 122. The actual formwork shell element 132 is illustrated in state in which it is still detached from the formwork shell 12. In the illustrated embodiment, the formwork shell 12 is provided with a formwork shell adapter 14*a* having an annular design. The formwork shell adapter 14*a* is attached in the mounting side 122 and flush with the mounting side 122. Here, the formwork shell adapter 14*a* has a male thread which is connected to the formwork shell 12 on its outer circumference. The formwork shell 12 is formed of a wood material here. The formwork shell adapter 14*a* is connected to the formwork shell 12 by means of its male thread configured as a self-tapping thread. In its interior, the formwork shell adapter 14*a* has a female thread provided for establishing a connection to the formwork shell element 132. For example, this female thread may be configured as a metric thread or as a fine thread. The formwork shell element 132 has a formwork shell attachment portion 1323 on its end facing leftwards. This formwork shell attachment portion 1323 is provided with a male thread configured to match the female thread in the formwork shell adapter 14*a*. The formwork shell element 132 can therefore be connected to the formwork shell adapter 14*a* in a simple manner with the aid of the formwork shell attachment portion 1323. The formwork shell element 132 can also be separated from the formwork shell adapter 14*a* and thus the formwork shell 12 in a simple manner by unscrewing. This embodiment benefits a rapid and easy replacement of the formwork shell element 132, for example in the case in which the formwork shell element 132 is worn. The formwork shell element 132 further comprises a shaft 1321. On one end this shaft 1321, the formwork shell attachment portion 1323 is located. On the opposite end of the shaft 1321, the connector head 1322 is located. The shaft 1321 has a central axis which is illustrated as a dashed line in FIG. 3 and located coaxial to the formwork shell adapter 14*a*, to the carrier element 131 illustrated on the right side, and to the beam adapter 14*b*. The connector head 1322 serves the force-fitted and form-closed connection of the formwork shell element 132 to the carrier element 131. In the illustrated embodiment, the connector head 1322 has two bending portions 13221 disposed symmetrically to each other or symmetrically to the central axis of the shaft 1321. These bending portions 13221 are configured to be elastically deformable and are compressed in the radial direction when the formwork shell element 1322 is inserted in the direction of the central axis of the shaft 1321. This compression generates an elastic return force in the bending portions 13221 which ultimately provides for the coherence of the formwork shell element 132 and the carrier element 131.

On the right side of FIG. 3, a cut peripheral portion of the formwork carrier 11 is illustrated. A carrier element 131 is illustrated in a state in which it is, in sections, already connected to the formwork carrier 11. A carrier adapter 14*b* having an annular configuration is located and fastened in the formwork carrier 11. On its outer circumference, this carrier adapter 14*b* has a male thread which is screwed into a recess in the formwork carrier 11. On its inner circumference, the carrier adapter 14*b* has a female thread provided for establishing a connection to the carrier element 131. On its end facing rightwards, the carrier element 131 has a carrier attachment portion 1313 for establishing a connection to the carrier adapter 14*b* which is configured as a male thread here. About one third of the carrier element 131 or the carrier attachment portion 1313 is screwed into the carrier adapter 14*b* here. For completing the connection of the carrier element 131 to the formwork carrier 11, the carrier element 131 will be completely screwed into the carrier adapter 14*b* until the carrier element 131 abuts on the edge of the recess in the formwork carrier 11 which faces rightwards. In this state, the surface of the carrier element 131 facing leftwards is then also flush with the surface of the remaining formwork carrier 11 which faces leftwards. In the illustrated embodiment, the carrier element 131 has a cavity 1311. The shape and size of this cavity 1311 substantially correspond to the shape and size of the connector head 1322, and it is provided for accommodating this connector head 1322. Favourably, the inner diameter of the cavity 1311 relative to the central axis of the shaft 1321 is configured slightly smaller than the outer diameter of the connector head 1322. In this way, the bending portions 13221 of the connector head 1322 are elastically compressed in the state inserted into the cavity 1311 and develop an elastic return force in the process which provides for the support of the connector head 1322 in the cavity 1311. Here, a cylindrically configured insertion recess 1312 is located between the cavity 1311 and the surface of the carrier element 131 which faces leftwards. In the illustrated state, the central axis of this insertion recess 1312 extends coaxial to the central axis of the shaft 1321. The inner diameter of the insertion recess 1312 is configured smaller than the largest inner diameter of the cavity 1311. In this way, there is an undercut at the transition between the insertion recess 1312 and the cavity 1311. This undercut interacts with the surface of the connector head 1322 which faces leftwards when the formwork shell elements 132 are connected to the carrier element 131 and thereby establishes a form-closed connection between the two elements in addition to the force-fitted connection already described. In the illustrated embodiment, the carrier element 131 has a rigid configuration. However, in an alternative embodiment, elastically deformable portions may also be provided on the carrier element 131. For setting of defining the threshold connecting force and the threshold separation force, a plurality of functional surfaces is disposed on the formwork shell element 132 and the carrier element 131. On its side facing in a direction towards the carrier element 131, the connector head 1322 has an insertion surface 132211 which is positioned at an acute angle to the central axis of the shaft 1321 here on each bending portion 13221. When inserting the formwork shell element 132 into the carrier element 131, this insertion surface 132211 interacts with a bushing insertion surface 13121 located on the left side of the insertion recess 1312 which is also positioned at an angle to the central axis of the shaft 1321. Owing to the angles of these two functional surfaces in the direction of which the movement of the formwork shell element 132 into the carrier element 131 takes place to the central axis of the shaft 1321 the two bending portions 13221 are compressed in the radial direction so that the outer diameter of the connector head 1322 is reduced. Due to this reduced outer diameter, the connector head 1322 now fits through the insertion recess 1312 and can be pushed into the cavity 1311. In the cavity 1311, the bending portions 13221 will elastically return until they abut on the outer diameter of the cavity 1311. In this state, the formwork shell element 132 and the carrier element 131 are then both force-fitted and form-closed connected to each other. The bending portions 13221 exert a pressure directed radially outwards on the wall of the cavity 1311 and thereby provide for a force-fitted connection. At the same time, the surfaces of the elastically returned bending portions 13221 facing leftwards in the illustration abut on the undercut in vicinity of the interface between the insertion recess 1312 and the cavity 1311 and thereby produce an additional form-closed connection. However, the connection between the formwork shell element 132 and the carrier element 131 is configured to be reversible here, i.e., the formwork shell element 132 can be pulled out of the carrier element 131 again in a destruction-free manner. Here, a pulling force in the direction of the central axis of the shaft 1321 which is directed leftwards in the illustration is applied to the formwork shell element 132. At the beginning of the separation of the two elements, a separation surface 132212 located on the connector head 1322 abuts on a bushing separation surface 13122 located in the transition portion between the insertion recess 1312 and the cavity 1311. These two functional surfaces are also positioned at an angle to the central axis of the shaft 1321. Due to the abutment of the separation surface 132212 on the bushing separation surface 13122, the bending portions 13221 are again compressed radially inwards by a pulling force applied to the formwork shell element 132 so that the outer diameter of the connector head 1322 is again reduced so that it fits through the insertion recess 1312. In this way, the formwork shell element 132 can be pulled out of the carrier element 131. Depending on the requirements of the current application, the threshold separation force and the threshold connecting force of the connector can be adapted by means of the size, shape, and particularly the angle of the functional surfaces. In the illustrated embodiment, a replacement of the formwork shell element 132 and the carrier element 131 is possible in a particularly easy manner due to the formwork shell adapter 14*a* and the carrier adapter 14*b*. For changing the threshold separation force and/or threshold connecting force, simply another combination of formwork shell element 132 and carrier element 131 can be used in this way on the construction site if this is required for the relevant application.

The embodiment of a connector 13 illustrated in FIG. 3 is not susceptible to thickness tolerances or moisture expansion and shrinkage of the formwork shell 12 in the thickness direction. Typical materials for a formwork shell 12 are wood materials which may expand or shrink depending on the humidity in their environment. At high moisture levels, wood materials tend to expand, that means, their dimensions in the thickness direction increase. In a dry environment, wood materials tend to shrink, that means, their dimensions in the thickness direction decrease. In the embodiment illustrated in FIG. 3, the entire formwork shell element 132 is located on the edge of the formwork shell 12 which faces rightwards. A change of the thickness of the formwork shell 12 has hardly any effect when the connector 13 is closed when the formwork shell element 132 is fit into the carrier element 131. The change in the thickness of the formwork shell 12 takes place in the direction of the side of the of formwork shell 12 facing away from the connector 13, to the left in FIG. 3. Therefore, changes in the thickness of the formwork shell 12 have no effect on the connection of the formwork shell element 132 to the carrier element 131.

FIG. 4 shows a schematic, cut side view of a carrier element 131 of an alternative embodiment of a formwork module 1 according to the invention. In FIG. 4, only the side of the formwork carrier 11 including the carrier element 131 is illustrated. For example, the illustrated carrier element 131 may be connected to a formwork shell element 132 according to the embodiment illustrated in FIG. 3. In contrast to the embodiment of a carrier element 131 illustrated in FIG. 3, the carrier element 131 in FIG. 4 includes two movably arranged latch elements 1314 which can provide for an additional form-closed connection between the formwork shell element 132 and the carrier element 131. Due to this additional form-closed connection, a higher threshold separation force can be achieved with a carrier element 131 according to the embodiment in FIG. 4 than with the embodiment of a carrier element 131 according to FIG. 3. The carrier element 131 in FIG. 4 is directly connected to the formwork carrier 11, i.e., without the carrier adapter 14*b*. For example, this connection may be implemented by a press fit. Analogous to the embodiment of the carrier element 131 illustrated in FIG. 3, the carrier element 131 in FIG. 4 has a cavity 1311 and an insertion recess 1312. On the edge of the insertion recess 1312 oriented towards the outer surface of the carrier element 131, a bushing insertion surface 13121 is located. On the side of the insertion recess 1312 facing the cavity 1311, a bushing separation surface 13122 is disposed. These two functional surfaces have the same function as in the embodiment illustrated in FIG. 3. Adjacent to the insertion recess 1312, two recesses facing upwards and downwards in the illustration are located in which two latch elements 1314 are movably supported. The movability of these latch elements 1314 is symbolically illustrated by a double-headed arrow. In a locked state, the latch elements 1314 can be moved into the insertion recess to thereby reduce the clear width of the insertion recess 1312. Likewise, one or more latch elements 1314 may be arranged adjacent to and movable relative to the cavity 1311. For connecting the formwork shell element 132 and the carrier element 131, the two latch elements 1314 are moved back into their recesses so that they do not protrude into the insertion recess 1312. In this opened state, the formwork shell element 132 can be inserted into the carrier element 131 as described in connection with FIG. 3. When the formwork shell element 132 is inserted into the carrier element 131 the latch elements 1314 are moved into the insertion recess 1312 as illustrated in FIG. 4 and will then form an undercut for the connector head 1322 of the formwork shell element 132. In this locked state, an additional form-closed connection between the formwork shell element 132 and the carrier element 131 is established by the latch elements 1314, whereby the threshold separation force of the connector 13 is increased. For moving the latch elements 1314, at least one latch mechanism 1315 is provided.

This latch mechanism 1315 translates an actuating movement into a movement of the latch elements 1314. In FIG. 4, various possibilities relating to the arrangement and to the functionality of the latch mechanism 1315 are illustrated. Extending to the right in the illustration, a latch mechanism 1315 is arranged which is accessible from the side of the formwork carrier 11 facing away from the formwork shell 12. Here, the latch mechanism 1315 comprises a shaft provided with a key section on its end facing rightwards. An operator can turn this key section with an associated tool or also by hand. This rotational movement is translated into a movement of the latch elements 1314 by the shaft of the latch mechanism 1315. As an alternative to a rotational movement, the latch mechanism 1315, as illustrated by dashed lines, may also be configured so that a translational movement moves the latch elements 1314 as symbolised by the double-headed arrow in the dashed area. Such a translational movement is easier to perform for an operator than a rotational movement. An alternative arrangement of the latch mechanism 1315 is illustrated as oriented downwards starting from the carrier element 131. This illustration shows a design which is analogous to the illustration facing rightwards and shows a latch mechanism 1315 operated by a rotating movement in solid lines, and a latch mechanism 1315 operated by a translational movement in dashed lines. This means that only one of the illustrated latch mechanisms 1315 can be provided. The arrangement of the latch mechanism 1315 depends on from which side the latch mechanism 1315 is to be accessible. Of course, also other arrangements and accessibilities of the latch mechanism 1315 are feasible, for example, starting from the carrier element 131, upwards in the direction of the boundary of the formwork carrier 11. Moreover, a latch mechanism 1315 may also be configured so that it is operable by remote control, for example by radio. In such an embodiment operable by remote control, no direct access to the latch mechanism 1315 is required which is advantageous in areas poorly accessible during the erection of building parts.

FIG. 5 shows a schematic, cut side view of a connector 13 of another embodiment of a formwork module 1 according to the invention. In FIG. 5, an embodiment of a connector 13 is illustrated which, as compared to the embodiments described above, involves a reversal in shape or function: in the embodiment illustrated in FIG. 5, the carrier element 131 disposed on the right side of the formwork carrier 11 is configured so that it projects and comprises a cylindrical shaft 134 as well as a connector head 135 projecting beyond this shaft 134. In this embodiment, the carrier element 131 comprises no cavity and no elastically deformable portions. On one end of its shaft 134, the carrier element 131 is connected to the formwork carrier 11 by means of a screw connection. Of course, this connection may also be configured differently, for example as a press-fit connection or as an adhesive connection. The shaft 134 of the carrier element 131 has a central axis which, in FIG. 5, is aligned coaxial to the central axis of the formwork shell element 132 illustrated on the left side. In this embodiment, the connector head 135 of the carrier element 131 is not configured to be rotationally symmetrical about its central axis. On the side of the connector head 135 facing upwards in FIG. 5, it is levelled. In this way, the connector head 135 is insertable into the undercut cavity 136 of the formwork shell element 132. In the illustrated embodiment, the formwork shell element 132 is completely located within the formwork shell 12 and does not project beyond it anywhere. In the illustrated embodiment, the formwork shell 12 has a continuous recess in which the formwork shell element 132 is arranged. This recess is accessible both from the concrete side 121 and from the mounting side 122. On the concrete side 121, the recess is covered by a cover 138. This cover 138 can be removed from the recess in a simple manner. The cover 138 may, for example, be configured as a plastic cap which can be levered off with the aid of a flat screwdriver from the concrete side 121. The cover 138 is configured so that it does not or only to a very small extent project beyond the surface of the concrete side 121. In this way, it is ensured that, in the production of a building part with the aid of the formwork shell 12, no undesired imprint caused by the cover 138 is caused on the produced building part. The formwork shell element 132 has an undercut cavity 136 facing rightwards. This undercut cavity 136 is substantially cylindrical and configured so that it is hollow inside. On the side of the undercut cavity 136 oriented in the direction of the formwork carrier 11, a barrier wall **136*a* extending in the circumferential direction is located. This barrier wall 136*a* has a barrier height 136*b* varying in the circumferential direction a. This barrier height 136*b* extends from the outer circumference of the undercut cavity 136 in the direction of the central axis represented by a dashed line, respectively. The barrier height 136*b* continuously increases in the circumferential direction about the undercut cavity 136. The barrier wall 136*a* having the varying barrier height 136*b* serves to establish a form-closed connection to the levelled connector head 135 of the carrier element 131. When, in the state illustrated in FIG. 5, the formwork shell 12 and the formwork carrier 11 are combined the levelled connector head 135 can be moved into the undercut cavity 136 past the barrier wall 136*a*. When the undercut cavity 136 and the barrier wall 136*a* disposed thereon are rotated, the connector head 135 projecting beyond the shaft 134 is undercut by the barrier wall 136*a* and thus form-closed arrested in the undercut cavity 136. In this way, the formwork shell element 132 and the carrier element 131 and thus the connector 13 formed of these elements are form-closed locked. A rotation of the formwork shell element 132 located in the formwork shell 12 is induced via the key section 137 facing in the direction of the concrete side 121. For example, this key section may be rotated from the concrete side 121 using a tool such as a wrench. A rotational movement applied to the key section 137 is transmitted to the undercut cavity 136 by the shaft 137*a*. With a rotating movement of the key section 137, therefore, the barrier height 136*b* of the undercut cavity 136 relative to the connector head 135 is changed, and the connector 13** is locked or, in the reverse direction, unlocked.

In the embodiment of a connector 13 illustrated in FIG. 5, the formwork shell element 132 extends almost through the complete formwork shell 12 in the thickness direction of the formwork shell 12. Changes in the thickness of the formwork shell 12 which are, for example, caused by an expansion or shrinkage of the material the formwork shell 12 is made of may therefore have an effect on the formwork shell element 132. When the thickness of the formwork shell 12 increases a blockade of the formwork shell element 132 may occur between the key section 137 and the undercut cavity 136. Favourably, a compensating member rendering a change of the length of the shaft 137*a* possible within certain limits is situated on or in the shaft 137*a*. Changes in the thickness of the formwork shell 12 can be compensated by this compensating member, and in this way, a stable functionality of the formwork shell element 132 can be ensured even in the event of moisture expansion or shrinkage of the formwork shell 12. For example, such a compensating member may include spring elements.

FIG. 6 shows a schematic, cut side view of a connector 13 of an alternative embodiment of a formwork module 1 according to the invention. FIG. 6 shows a connector 13 which differs from the embodiments already described. In this embodiment, the formwork shell element 132 and the carrier element 131 are configured identical in their design and substantially correspond to the carrier element 131 illustrated in and described in connection with FIG. 3. In the embodiment in FIG. 6, both the formwork shell element 132 and the carrier element 131 have a cavity 1311 and an insertion recess 1312, respectively. Both the formwork shell element 132 and the carrier element 131 are rigidly configured and do not comprise any elastically deformable portions. In the illustration, the formwork shell element 132 and the carrier element 131 are directly connected to the formwork shell 12 or the formwork carrier 11. The carrier element 131 has larger dimensions than the formwork shell element 132. Here, the formwork shell element 132 and the carrier element 131 are made of a low-wear material, for example of metal or a hard plastic material. In the illustrated embodiment, the connector 13 further comprises an intermediate element 133. This intermediate element 133 has two connector heads 133*a* and 133*b* which are fastened on one side of a shaft 133*c* disposed therebetween, respectively. The connector head 133*a* facing leftwards is configured smaller than the connector head 133*b* facing leftwards. The smaller connector head 133*a* which faces leftwards is provided for establishing a connection to the formwork shell element 132 having smaller dimensions, and the larger connector head 133*b* facing leftwards is provided for establishing a connection to the carrier element 131 having larger dimensions. Analogous to the connector head 1322 illustrated and described in FIG. 3, the two connector heads 133*a* and 133*b* have two elastically deformable bending portions which are elastically deformed during the insertion into the formwork shell element 132 and the carrier element 131 and establish a force-fitted and form-closed connection in this way. In the illustrated embodiment, the intermediate element 133 is made of an elastically deformable plastic material. For establishing a connection between formwork shell 12 and formwork carrier 11, the connector head 133*a* is inserted into the formwork shell element 132, and the connector head 133*b* is inserted into the carrier element 131. The mechanisms and steps described in FIG. 3 apply analogously to this insertion as well as to a subsequent separation. The embodiment illustrated in FIG. 6 is advantageous in that all wear experienced due to the repeated connection and separation of the connector 13 is only produced on the intermediate element 133. Wear can be compensated in a simple manner by exchanging this intermediate element 133. The formwork shell element 132 and the carrier element 131 are configured so that they are substantially free of wear and can permanently remain in the formwork shell 12 or in the formwork carrier 12. The connection between the carrier element 131 and the intermediate element 133 is dimensioned larger and has therefore a higher threshold separation force than the connection between the formwork shell element 132 and the intermediate element 133. Thereby, it is ensured that, when a pulling force directed away from the formwork carrier 11 is applied to the formwork shell 12, the threshold separation force between the formwork shell element 132 and the intermediate element 133*a* is exceeded first, and that, therefore, a separation takes place at this position. During the separation, the intermediate element 133 therefore remains connected to the carrier element 131. If desired, the separation of the formwork carrier 11 from the intermediate element 133 may also take place before a separation of the formwork shell 12 from the intermediate element 133 takes place when the dimensions are reversed. Analogous to the embodiment illustrated in FIG. 4, the embodiment illustrated in FIG. 6 may also be provided with one or more latch elements 1314.

FIG. 7 shows a schematic, cut side view of part of an embodiment of a formwork module 1 according to the invention including an edge element 15. FIG. 6 shows a cross-sectional view of a section of a frame 111, a support panel 112, and a formwork shell 12 of an embodiment of a formwork element 1 according to the invention. On the right side, facing downwards in the illustration, a part of the frame 111 of a formwork carrier 11 is illustrated. On its side facing upwards, the frame 111 comprises a protruding guide rail 1111 here. This guide rail 1111 may extend around the entire frame 111 or part of it. Adjacent to the guide rail 1111, there is a planer portion of the frame 111 in which a carrier element 131 is located. On the left side, adjacent to this planar portion, a shoulder serving the establishment of a connection to the support panel 112 illustrated on the left side is disposed in the frame 111. Such a support panel can also be seen in and was described in connection with FIG. 2. The support panel 112 has a circumferential protrusion corresponding to the shoulder in the frame 111 in size and shape. This protrusion of the support panel 112 is inserted into the frame 111 and connected to it by means of screw connections here. The support panel 112 serves the mechanical stabilisation of the formwork carrier 11 as well as the enlargement of the surface of the formwork carrier 11 which faces the formwork shell 12. In the support panel 112, also a carrier element 131 is located. The carrier element 131 in the support panel 112 has smaller dimensions and therefore a smaller threshold separation force than the carrier element 131 disposed in the frame 111. In the illustrated embodiment, therefore, a connector 13 having a higher threshold separation force than the connector 13 located in the support panel 112 in the central area of the formwork carrier is disposed in the peripheral portion of the formwork carrier 11. This arrangement has been found to be particularly advantageous in practice since, during the detachment of the formwork module 1 after the erection of a building part, the adhesive force of the formwork shell 12 on the erected building part is larger in the peripheral portion of the formwork module 1 than in its centre which, in case of an insufficient threshold separation force in the peripheral portion, may lead to an unintended separation of the formwork shell 12 from the formwork carrier 11. In the illustrated embodiment, therefore, the threshold separation force per surface area of the formwork shell 12 and the formwork carrier 11 is larger in their edge and corner portion than in the central area. On the upper side of the illustration in FIG. 7, a section of a formwork shell 12 can be seen. This formwork shell 12 has a multi-layered configuration and a coating on its concrete side 121. On the mounting side 122, the formwork shell 12 has a shoulder 124 extending around the outer circumference, this shoulder 124 having a shape which is complementary to the guide rail 1111 of the frame 111. This means that the guide rail 1111 fits into the shoulder 124. This form-closed connection serves a facilitated connection or positioning of the formwork shell 12 relative to the formwork carrier 11. On the mounting side 122 of the formwork shell 12 facing downwards, two formwork shell elements 132 are disposed which correspond to the carrier element 131 correspondingly arranged opposite and form a connector 13, respectively. On the side of the of formwork shell 12 facing rightwards, an edge element 15 is fitted to the edges located on the circumference of the formwork shell 12. This edge element 15 is configured as a skirting and made of an elastically deformable material, for example a thermoplastic plastic material or a rubber. On the one hand, the edge element 15 serves the mechanical protection of the formwork shell 12 during transport and during the assembly of the formwork module 1. Furthermore, the edge element 15 serves to seal the formwork shell 12 of a formwork module 1 with respect to the formwork shell 12 of another formwork module 1 disposed adjacent thereto in the formwork. Such a further, adjacently arranged formwork module 1 may be arranged in axial symmetry to the boundary of the edge element 15 facing rightwards. In this constellation, the two edge elements 15 of adjacent formwork modules 1 abut on each other. Due to their elastic properties, a good seal between the adjacent formwork shells 12 is ensured. With such a good seal, an excellent surface quality which can be expressed in a high exposed concrete category can be achieved on the building part to be erected. In the illustrated embodiment, the edge element 15 is flush with the concrete side 121 in the thickness direction of the formwork shell 12. However, the edge element 15 may also be configured so that it protrudes beyond the formwork shell 12 in the direction of the concrete side 121 and/or the opposite direction.

FIG. 8 shows a schematic perspective view of an embodiment of a formwork shell 12 including a formwork shell adapter 14*a* and a formwork shell element 132. In FIG. 8, the peripheral portion of a formwork shell 12 can be seen. In the illustration, the mounting side 122 faces upwards, the circumferential edge 123 can be seen facing forwards. Here, the formwork shell 12 is formed by a multi-layered plywood panel having a coating applied to the concrete side 121 and to the mounting side 122 in a planar manner. The formwork shell adapter 14*a* is formed by a plastic part here and is form-closed fastened on the mounting side 122 directly adjacent to the edge 123 of the formwork shell 12. On the mounting side 122, the formwork shell 12 has a recess having an undercut in which the peripheral portion of the formwork shell adapter the 14*a* engages. Here, this recess is formed by a milled recess having a dovetail-shaped peripheral portion. The interaction of the shapes of the recess and of the formwork shell adapter 14*a* can be seen in detail in the cross-sectional view in FIG. 10. In the embodiment illustrated in FIG. 8, the formwork shell adapter 14*a* was pushed into in the undercut recess in the formwork shell 12 by a linear sliding movement in direction of the arrow shown adjacent to the formwork shell adapter. Due to the interaction of the undercut and of a portion of the formwork shell adapter 14*a* having a corresponding negative form, a form-closed connection between the two elements was established which acts in a direction perpendicular to the mounting side 122 and therefore prevents a separation of the formwork shell 12 from the formwork shell adapter 14*a* in this direction. In a plan view of the mounting side 122, the formwork shell adapter 14*a* has a rectangular portion facing forwards in the illustration and an area having rounded corners facing backwards in the illustration. This design is particularly favourable since it completely fills a recess produced by means of a form cutter rotating in an axis perpendicular to the mounting side 122. In the illustrated embodiment, the surface of the formwork shell adapter 14*a* facing upwards is flush with the mounting side 122 or offset to the rear relative to the mounting side 122. The formwork shell adapter 14*a* has a recess 14*al* in its interior into which the formwork shell element 132 is form-closed inserted. On its, in the illustration, right and left side, this recess 14*al* has an undercut, respectively, into which a portion of the formwork shell element 132 is inserted. In this way also, a form-closed connection acting in a direction perpendicular to the mounting side 122 is established between the formwork shell adapter 14*a* and the formwork shell element 132. The installation of the formwork shell element 132 in the formwork shell adapter 14*a* is performed by a linear insertion movement of the formwork shell element 132 into the recess 14*al* which is also performed in the direction of the arrow shown adjacent to the formwork shell adapter 14*a*. The connection between the formwork shell element 132 and the formwork shell adapter 14*a* is configured to be reversible, that means, the formwork shell element 132 can be exchanged in a simple manner, for example in a case in which it is worn due to repeated use. Moreover, the formwork shell element 132 can be removed, for example also prior to a transport of a plurality of formwork shells 12 stacked on top of each other, to facilitate the stacking of the formwork shells 12. Before the formwork shells 12 are put into service, the formwork shell element 132 may then again be connected to the formwork shell adapter 14*a* by a simple sliding movement. In the illustrated embodiment, the formwork shell element 132 is also formed of a plastic material. On the peripheral portion adjoining the recess 14*al* in the formwork shell adapter 14*a* in the front, two retaining latches 14*a*2 are provided which are configured so that they are elastically deformable relative to the remaining formwork shell adapter 14*a*. When the formwork shell element 132 is inserted, these retaining latches 14*a*2 are temporarily bent upwards and spring back into their original position when the formwork shell element 132 is completely inserted into the recess 14*al*. In this original position, a form-closed connection preventing the formwork shell element 132 from accidentally sliding of out of the formwork shell adapter 14*a* is established in a direction parallel to the mounting side 122. This form-closed connection is achieved by a hook, respectively, which protrudes beyond a retaining latch 14*a*2 in the direction of the concrete side, respectively, and, in the illustrated state, forms an undercut for the inserted formwork shell element 132. The two retaining latches 14*a*2 therefore secure the formwork shell element 132 in the formwork shell adapter 14*a*. For removing the formwork shell element 132 from the formwork shell adapter 14*a*, the two retaining latches 14*a*2 are again elastically bent upwards, whereby the formwork shell element 132 can be pulled out of the recess 14*al*. However, the retaining latches 14*a*2 are not crucially required. For example, an alternative way of securing the formwork shell element S132 in the formwork shell adapter 14*a* may be implemented by providing for a slight press fit between formwork shell element 132 and the undercut recess 14*al* in addition to the form-closed connection. Due to this press fit, the formwork shell element 132 can then only be pulled out of the formwork shell adapter 14*a* by overcoming an increased pushing force. With such a mechanism as well, the formwork shell element 132 can be prevented from accidentally falling out of the recess 14*a*1.

FIG. 9 shows a schematic perspective view of an embodiment of a formwork shell element 132. In FIG. 9, the formwork shell element 132 of FIG. 8 is illustrated separately. This formwork shell element 132 comprises a connector head 1322 on the upper side in the illustration and a shaft 1321 on the lower side in the illustration. The shaft 1321 corresponds to the formwork shell attachment portion 1323 since the connection of the formwork shell element 132 to the formwork shell 12 is established via the formwork shell adapter 14*a* and the shaft 1321 as interfaces. In FIG. 8, the connection of the formwork shell element 132 to the formwork shell adapter 14*a* is established via the shaft 1321. Here, the shaft 1321 has three fins 1321*a* which form portions which are inserted into the undercut of the recess 14*al* in the formwork shell adapter 14*a* and are thereby brought into a form-closed connection to it. In a plan view of the mounting side 122, the three fins 1321*a* are regularly distributed around the circumference of the shaft, here at an angle of 120° with respect to each other relative to the centre of the shaft 1321, respectively. Between the fins 1321*a*, gaps are provided in the circumferential direction. These gaps render a connection of the illustrated formwork shell element 132 to a formwork shell adapter 14*a* according to the illustration in FIG. 11 possible. Here, the connector head 1322 has four bending portions 13221 regularly arranged around the central axis of the formwork shell element 132. These bending portions 13221 are elastically deformable relative to the shaft 1321. When the formwork shell element 132 is connected to a carrier element 131, the bending portions 13221 are elastically bent inwards in the direction of the central axis of the formwork shell element 132. Each bending portion 13221 has a curved insertion surface 132211 facing upwards on its outer circumference. When the connection to a carrier element 131 is established, this insertion surface 132211, at least in sections, abuts on the carrier element 131. When a normal force is applied to the formwork shell element 132, due to the curvature of the insertion surface 132211, a force acting in the radial direction to the central axis of the formwork shell element 132 is generated which bends the associated bending portion 13221 inwards so that the outer circumference of the connector head 1322 is reduced and it can therefore enter the carrier element 131. Following this entry, no radial force will act on the bending portion 13221 any longer so that it will elastically return so that a form-closed connection is established between the formwork shell element 132 and the carrier element 131. Each bending portion 13221 has, in a distance to the insertion surface 132211, a separation surface 132212 which is also curved, respectively. The curvature of the separation surface 132212 is directed in the opposite direction of the curvature of the insertion surface 132211 or is opposite in sign. During the separation of the formwork shell element 132 and the carrier element 131, the separation surface 132212, at least in sections, abuts on the carrier element 131. When, in this state, a pulling force perpendicular to the mounting side is applied to the formwork shell element 132, the curvature of the separation surface 132212 will induce the generation of a force radial to the central axis of the formwork shell element 132 so that the bending portion 13221 is bent inwards. Due to this elastic deformation, the outer circumference of the connector head 1322 is again reduced so that it can be pulled out of the carrier element 131. The illustrated embodiment of a formwork shell element 132 can therefore be connected to or separated from a carrier element 131 by applying a normal force perpendicular to the mounting side 122 alone. A tool or the like is not required for establishing or separating the connection here. Instead of the illustrated curved implementation, the insertion surface 132211 and the separation surface 132212 may also be configured so that they are planar and inclined, the surfaces being positioned at an angle to the central axis or to a direction perpendicular to the mounting side in such a planar implementation. The insertion surface 132211 and the separation surface 132212 as well as the interaction of these surfaces with the carrier element 131 are analogous to the embodiment in FIG. 3. Therefore, the description of the embodiment in FIG. 3 also applies to the same or analogous components and contexts. An alternative embodiment of a connector head 1322 and thus of a formwork shell element 132 is illustrated in FIG. 10.

FIG. 10 shows a cut side view of an embodiment of a formwork shell 12 including a formwork shell adapter 14*a* and a formwork shell element 132. In FIG. 10, a portion similar to the one in FIG. 8 can be seen. While a formwork shell element 132 according to FIG. 9 is installed in the formwork shell adapter 14*a* in FIG. 8, a formwork shell element 132 having another design is inserted in the formwork shell adapter 14*a* in the cross-sectional view in FIG. 10. The formwork shell element 132 in FIG. 10 also comprises a connector head 1322 having a plurality of bending portions 13221. These bending portions 13221 have an insertion surface 132211, respectively, which, here as well, is provided for translating a force acting in a direction perpendicular to the mounting side 122 into a force acting radial to the central axis of the formwork shell element 132 which will then bend the bending portion 13221 inwards. Instead of the separation surface 132212 of FIG. 9, the formwork shell element 132 has a retaining surface 132213 oriented parallel to the mounting side 122 in FIG. 10. In a state of the formwork shell element 132 in which it is directly connected to a carrier element 131 or the formwork carrier 11, the retaining surface 132213 abuts on a surface of the formwork carrier 11 or of the carrier element 131 in a planar manner or is positioned parallel to it in a small distance. In this embodiment, when a normal force away from the formwork carrier 11 is applied to the formwork shell element 132 no radial force bending the bending portion 13221 inwards and thereby releasing the form-closed connection to the formwork carrier 11 or the carrier element 131 is generated by the orientation of the retaining surface 132213. The embodiment of a formwork shell element 132 illustrated in FIG. 10 can therefore not be separated from the formwork carrier by a pulling force directed away from it alone. For separating the connection between the formwork shell element 132 and the carrier element 131 or the formwork carrier 11, a separating tool 16 has to be used to bend the bending portions 13221 radially inwards and to thereby release the form-closed connection. The use of such a separating tool 16 is illustrated in and described in connection with FIG. 15. With the exception of the different embodiment of the formwork shell element 132, the other elements or components are identical to the illustration in FIG. 8. In the cross-sectional view, it is clearly visible that a, in this view, dovetail-shaped recess is incorporated in the mounting side 122 of the formwork shell 12. In this recess, the also dovetail-shaped formwork shell adapter 14*a* is inserted in this view. On the right side and the left side, the inclined outer surfaces of the formwork shell adapter 14*a* abut on likewise inclined inner surfaces of the recess so that a form-closed connection is established in the undercut of the recess. In the illustrated state, therefore, the formwork shell adapter 14*a* can no longer be removed from the formwork shell 14 in a direction perpendicular to the mounting side 122, in the illustration upwards, and is therefore fixed. The planar surface of the formwork shell adapter 14*a* facing away from the formwork shell element 132 abuts on a planar surface of the recess in the formwork shell 12 facing in the direction of the mounting side 122. Therefore, the formwork shell adapter 14*a* abuts on the recess in the formwork shell 12 with three planar surfaces which are oriented in different directions. In the cross-sectional view, it can also be clearly seen that, inside the formwork shell adapter 14*a*, the recess 14*al* is situated which comprises an undercut on the right and on the left side, respectively. Into each of these undercuts, a fin 1321*a* of the shaft 1321 of the formwork shell element 132 is inserted, respectively, whereby also a form-closed connection is established between the formwork shell adapter 14*a* and the formwork shell element 132. The fins 1321*a* are portions of the formwork shell element 132. Of course, also a formwork shell element 132 according to the embodiment illustrated in FIG. 9 can be provided in the formwork shell adapter 14*a* of FIG. 10.

FIG. 11 shows a plan view and a side view of an embodiment of a formwork shell adapter 132. In FIG. 11, two views of a formwork shell adapter 14*a* are shown, on the top in a plan view and below in a side view. Here, the formwork shell adapter 14*a* represents an alternative embodiment to the embodiments in FIGS. 8 and 10. The embodiment of a formwork shell adapter 14*a* illustrated in FIG. 11 is connected to the formwork shell 12 (not illustrated) by a press-fit connection. For establishing this press-fit connection, first, a recess without an undercut defined by defining walls extending perpendicular to the mounting side is provided in the mounting side 122 of the formwork shell 12. In the illustrated embodiment of a formwork shell adapter 14*a*, a cylindrical recess having a planar inner bottom is produced in the formwork shell, for example by milling. Then, the formwork shell adapter 14*a* is pressed into the recess in a direction perpendicular to the mounting side 122. Here, the outer diameter of the formwork shell adapter 14*a* is slightly larger than the inner diameter of the recess. The press-fit establishes a force-fitted connection fixing the formwork shell adapter 14*a* in the formwork shell 12 in a direction perpendicular to the mounting side 122. This force-fitted connection is established by press fitting in a plane parallel to the mounting side 122. As can be seen in the side view below in FIG. 11, the formwork shell adapter 14*a* has a plurality of ribs having insertion slopes facilitating the positioning and press fitting into the formwork shell 12 on its outer circumference here. In the side view illustrated below, the end of the formwork shell adapter 14*a* facing upwards is open so that a formwork shell element, for example according to the embodiment illustrated in FIG. 9, can be introduced into this opening. The plan view illustrated above the side view in FIG. 11 complies with the folding rule and shows the formwork shell adapter 14*a* with its closed side positioned on the bottom in the side view. Therefore, the inner contour is represented by dashed lines in the plan view. In its interior, the formwork shell adapter 14*a* also has a recess having a substantially cylindrical configuration here. The three retaining ribs 14*a*3 protrude radially into the inside of the recess from the inner wall of the recess. Between the retaining ribs 14*a*3 and the inner bottom surface of the recess in the formwork shell adapter 14*a* an undercut is formed, respectively, which can be brought into a form-closed connection to a section of the formwork shell element 132. The three retaining ribs 14*a*3 are disposed on the inner circumference of the formwork shell adapter 14*a* in regular intervals in the circumferential direction. In the plan view, the three retaining ribs 14*a*3 are, relative to the centre of the formwork shell adapter 14*a*, oriented at an angle of 120° with respect to each other, respectively. The three fins 1321*a* of the formwork shell element 132 of FIG. 9 may be pushed into the recess in the formwork shell adapter 14*a* between the three retaining ribs 14*a*3. With a subsequent rotation of the formwork shell element 132 relative to the formwork shell adapter 14*a*, a form-closed connection similar to a bayonet lock can be established between the formwork shell adapter 14*a* and the formwork shell element 132. Due to the rotation of the fins 1321*a* below the retaining ribs 14*a*3, the formwork shell element 132 is fixed in the formwork shell adapter 14*a* in a direction perpendicular to the mounting side 122. This rotational movement for mounting and dismounting the formwork shell element 132 can be easily performed by hand so that the formwork shell element 132 can be conveniently exchanged. Instead of the press fit in the formwork shell 12, it is also possible to fix the formwork shell adapter 14*a* illustrated in FIG. 11 with the aid of connecting elements, for example screws.

FIG. 12 shows a plan view of an embodiment of a formwork shell 12 comprising a plurality of formwork shell adapters 14*a*. In FIG. 12, a formwork shell can be seen in a plan view of its mounting side 122. On the left side, the entire formwork shell 12 can be seen, on the right side, a detailed view of the portion marked by a circle on the left side is shown. In the overall view on the left side, various formwork shell adapters 14*a* are incorporated on the left upper edge. In the remaining portion of the formwork shell 12, a plurality of already prepared recesses A can be seen. First, the installed formwork shell adapters 14*a* will be described with reference to the detailed view shown on the right side. On the edges of the formwork shell 12, directly adjacent to the edges, two formwork shell adapters 14*a* according to the embodiment shown in FIG. 8 are disposed. These formwork shell adapters 14*a* are inserted into the formwork shell 12 from the edge and, in the illustrated state, fixed by a form-closed connection to the formwork shell 12 in a direction perpendicular to the mounting side 122. Into these formwork shell adapters 14*a* disposed on the edge, formwork shell elements 132 may be introduced and removed again in a simple manner by a sliding movement. For example, formwork shell elements 132 according to the embodiment illustrated in FIG. 9 may be inserted into these formwork shell adapters 14*a*. Spaced apart from the edge of the formwork shell 12, another formwork shell adapter 14*a* can be seen which is not disposed directly adjacent to the edge. This formwork shell adapter 14*a* which is spaced apart from the edge is configured according to FIG. 11 and connected to the formwork shell 12 by a press-fit connection. A formwork shell element 132 can be inserted into the formwork shell adapter 14*a* spaced apart from the edge in a direction perpendicular to the mounting side 122 and form-closed connected to the formwork shell adapter 14*a* by a rotational movement about an axis perpendicular to the mounting side 122. The number and distribution the formwork shell adapters 14*a* illustrated in FIG. 12 is exemplary. A different number of formwork shell adapters 14*a* may also be provided, likewise, the distribution the formwork shell adapters 14*a* across the formwork shell may be different. For example, a plurality of formwork shell adapters 14*a* according to FIG. 11 may be provided in a press-fit connection at a distance from the edge. Alternatively, or in addition, also formwork shell adapters 14*a* according to the embodiment shown in FIG. 8 may be form-closed connected to the formwork shell 12 at a distance from the edge. For such a connection, an insertion portion first permitting the production of a recess having an undercut in the formwork shell 12 and then allowing the form-closed insertion of a formwork shell adapter 14*a* into the formwork shell 12 is required in the formwork shell 12. Finally, it is also possible that formwork shell adapters 14*a* according to both the embodiment illustrated in FIG. 8 and the embodiment illustrated in FIG. 11 are disposed in a distance to the edge of the formwork shell. Finally, also formwork shell adapters 14*a* according to the embodiment of FIG. 11 may be connected to the formwork shell 12 in a press-fit connection directly adjacent to the edge of the formwork shell 12. In the overall view on the left side of FIG. 12, a state can be seen which occurs during the installation of the formwork shell adapters 14*a* in the formwork shell 12. In the upper left corner, the formwork shell adapters 14*a* are already connected to the formwork shell, in the remaining portion of the formwork shell 12, the prepared recesses A are still unequipped. Formwork shell adapters 14*a* may be inserted into all of the prepared recesses A. Moreover, it is also possible to dispose formwork shell adapters 14*a* in only part the prepared recesses A. Finally, further recesses A in other positions may be added and provided with formwork shell adapters 14*a*. Preferably, the formwork shell adapters 14*a* and their connection to the formwork shell 12 are configured so that they remain connected to the formwork shell 12 throughout its life cycle. With the connector 13 according to the invention, significant wear during an exchange and restructuring of a formwork 12 only occurs on the very easily replaceable formwork shell element 132.

FIG. 13 shows a schematic perspective view of another embodiment of a carrier element 131 and of a formwork shell element 132. In FIG. 13, a further implementation of a connector 13 is illustrated. A carrier element 131 and a formwork shell element 132 are shown in the unmounted state. On the right side, the formwork shell element 132 can be seen which comprises a shaft 1321 disposed beneath and a connector head 1322 facing upwards. The shaft 1321 corresponds to the formwork shell attachment portion 1323 since the connection of the formwork shell element 132 to the formwork shell 12 takes place via the formwork shell adapter 14*a* and the shaft 1321 as interfaces. Here, the connector head 1322 has four bending portions 13221 which are uniformly distributed around the central axis of the formwork shell element 132. The four bending portions 13221 enclose a bending recess 13222. Similar to the embodiment described in FIG. 3, the bending portions 13221 are elastically deformed when the formwork shell element 132 is connected to the carrier element 131. In contrast to the embodiments of a formwork shell element in FIG. 3, FIG. 9, and FIG. 10, the bending portions 13221 are elastically bent to the outside in the embodiment of FIG. 13, away from the central axis of the formwork shell element 132 and away from the bending recess 13222. In the embodiment shown, the shaft 1321 is configured as a closed circular disc. The outer peripheral portion of this circular disc may be inserted into, for example, a formwork shell adapter 14*a* according to the embodiment of FIG. 8. Due to the established form-closed connection, the formwork shell element 132 can be connected to the formwork shell 12 in a simple manner by such a formwork shell adapter 14*a*. Therefore, a convenient exchangeability of the formwork shell element 132 is also given in this embodiment. The carrier element 131 illustrated on the left side is provided for the direct connection to the formwork carrier 11, that means, preferably without an interposed carrier adapter 14*b*. In the centre of the carrier element 131, a gripping portion 1316 protruding beyond adjacent portions is disposed. This gripping portion 1316 is encompassed by the bending portions 13221 when a connection to the formwork shell element 132 is established. During the establishment of such a connection, the gripping portion 1316 enters the bending recess 13222 between the bending portions 13221. Assuming a cylindrical basic shape, the gripping portion 1316 is provided with a protrusion 1316*a* disposed roughly in the centre of its height here. In a cross-sectional view through the central axis of the carrier element 131 as shown in FIG. 14, the protrusion 1316*a* protrudes to the central axis of the carrier element 131 in the radial direction. In this way, an undercut which can be used for establishing a form-closed connection to the tips of the bending portions 13221 of the formwork shell element 132 facing inwards emerges below the portion of the protrusion 1316*a* protruding the furthest in the radial direction to the central axis. For facilitating the establishment of the connection, an insertion slope 13221*b* oriented towards the central axis and the bending recess 13222 is disposed on the side of the bending portions 13221 facing away from the shaft 1321. When a connection to the carrier element 131 is established this insertion slope 13221*b* is moved above the end of the gripping portion 1316 facing upwards in the illustration and guides the bending recess 13222 to the gripping portion 1316 during the remaining advance movement. During the advancement of the formwork shell element 132 and the carrier element 131 in a direction parallel to the central axes of the two elements, the bending portions 13221 are pushed radially outwards and guided around the gripping portion 1316 and the protrusion 1316*a* in this way by the insertion slope 13221*b*. In the connected position of the formwork shell element 132 and the carrier element 131, the end portions of the bending portions 13221 facing away from the shaft 1321 encompass the protrusion 1316*a* on the outer surface of the gripping portion 1316 and engage in the undercut disposed below the protrusion 1316*a*. In this way, then, the formwork shell element 132 and the carrier element 131 are connected to each other both by a form-closed connection and by a force-fitted connection between the bending portions 13221 and the gripping portion 1316.

Around the gripping portion 1316, a bending portion accommodation 1317 is disposed. Here, this bending portion accommodation 1317 is configured as an annular channel which extends around and completely surrounds the gripping portion 1316. The bending portion accommodation 1317 accommodates the radial bending portions 13221 bent radially outwards when the connector 13 is connected.

To the outside, the bending portion accommodation 1317 is defined by a guiding portion 1318. This guiding portion 1318 has an annular configuration and encloses the gripping portion 1316 in the circumferential direction. The height of the guiding portion 1318 substantially corresponds to three quarters of the height of the gripping portion 1316 here. The guiding portion 1318 is provided for guiding the carrier element 131 during the installation in a support panel 112 or, in the reverse, for guiding the support panel 112 relative to the fastened carrier element 131. This function is more clearly visible in FIG. 14. Finally, the carrier element 131 has a bottom portion 1320 connecting the gripping element 1316 to the guiding member 1318. The bottom portion 1320 is configured as a circular disc and has planar surfaces on the, in the illustration, upper and lower side.

In the centre of the carrier element 131, an attachment portion 1319 concentric to the gripping portion 1316 is disposed. This attachment portion is provided for fastening the carrier element 131 on a frame 111 or on a support panel 112 of the formwork carrier 11. Here, the attachment portion 1319 comprises a cylindrical recess 1319*a* extending along the central axis of the carrier element 131. Through this recess 1319*a*, for example, a connecting element such as a screw can be passed. A tapered receptacle 1319*b* provided for accommodating a head of a connecting element, for example a screw head, is disposed adjacent to the side of the recess 1319*a* facing upwards. In this embodiment, a countersunk screw by means of which the carrier element 131 is then screwed to the formwork carrier 11 can be inserted into the attachment portion 1319. By providing the receptacle 1319*b*, the screw head is completely embedded in the carrier element 131 and therefore protected. Alternatively, it is also possible to provide no recess in the attachment portion 1319 but to integrate a fastening element protruding downwards beyond the carrier element 131 in the carrier element 131. For example, this can be realised by injecting a screw or a similar fastening element into the carrier element 131 as a moulded plastic part during the production of the carrier element 131. In the illustrated embodiment, as regarded from the inside to the outside in a plan view, the attachment portion 1319, the gripping portion 1316, the bending portion accommodation 1317, and the guiding portion 1318 have an annular configuration and are arranged concentrically to each other.

In this embodiment of a connector 13, the carrier element 131 disposed on the formwork carrier 11 has no cavity having a small volume. Empirically, the risk of contamination on the construction site is higher on the side of the formwork carrier 11 than on the mounting side 122 of the formwork shell. For this reason, it is advantageous that the carrier side which is more at risk of being contaminated comprises no cavity having a small volume which might become filled with contaminants and accidentally closed thereby. The embodiment of a carrier element 131 illustrated in FIG. 13 is therefore less susceptible to contamination, or potentially encountered contaminants can be cleanly removed from the high-volume bending portion accommodation 1317 in a simple manner due to the design. This increases the reliability of the connector 13.

FIG. 14 shows a partly cut, schematic side view of an embodiment of a connector 13. In FIG. 14, the connector 13 according to the embodiment shown in FIG. 13 is shown in the installed and closed state. In the lower part of the illustration, a formwork shell 12 can be seen into which a formwork shell adapter 14*a* according to the embodiment illustrated in FIG. 8 is form-closed inserted. In the formwork shell adapter 14*a*, a formwork shell element 132 according to the embodiment illustrated in FIG. 13 is inserted and form-closed fixed in a direction perpendicular to the surface of the formwork shell 12. The formwork shell 12 abuts on the formwork carrier 11 which is illustrated only in sections here. The formwork carrier 11 comprises a frame 111 shown on the upper side in the illustration to which a support panel 112 is attached. A possible interaction of the frame 111 and the support panel 112 is illustrated in FIG. 2. In the illustrated form, the support panel 112 receives a large part of the forces transmitted to the formwork shell 12 by concrete and from there to the formwork carrier 11. The support panel 112 is therefore positioned in the flow of forces between the formwork shell 12 and the frame 111. The provision of such a support panel 112 is advantageous in that the formwork shell 12 itself needs to be less bending-resistant than in a case in which no support panel 112 is provided. Therefore, the formwork shell 12 can be thinner and therefore more light-weight and cost-effective. For example, the support panel 112 may be formed by two metal sheets arranged parallel to each other between which a corrugated metal sheet is disposed for increasing the bending resistance. Alternatively, the support panel 112 can also be a massive metal plate, a plywood panel, or another panel. In the illustrated embodiment, the carrier element 131 is positioned and fastened within the support panel 112. In the illustrated, closed state of the connector 13, the bending portions 13221 encompass the gripping portion 1316. Here, the ends of the bending portions 13221 facing upwards in the illustration are in engagement with an undercut which is situated between the protrusion 1316*a* and the bottom portion 1320. In this way, there is a form-closed connection fixing the formwork shell element 132 relative to the carrier element 131 in a direction perpendicular to the surface of the formwork shell 12. A connector 13 according to the illustrated embodiment can be separated by only applying a normal force directed away from the formwork carrier 11 to the formwork shell 12. On the radially inner side of the bending portions 13221, separation surfaces 13221*c* are situated, respectively, which are inclined relative to central axis of the formwork shell element 132 in the connected to state. In the illustrated connected state, these separation surfaces 13221*c* respectively abut on a flank surface 1316*b* which is also inclined and located on the outer circumference of the gripping portion 1316 in the area of the undercut. The flank surface 1316*b* is disposed between the protrusion 1316*a* and the bottom portion 1320. When a normal force is applied to the formwork shell element 132 a force directed radially outwards which elastically deforms the bending element 13221 to the outside is generated by the abutment of separation surface 13221*c* on the flank surface 1316*b* so that the form-closed connection to the gripping portion 1316 is released. In this way, the formwork shell element 132 can be pulled off the carrier element 131. This connection is also completely reversible and can be closed and separated multiple times. In the centre of the carrier element 131, the attachment portion 1319 is disposed into which a fastening element in form of a screw S is inserted here. The screw head of the screw S is inserted in the receptacle 1319*b* here, the shaft of the screw S passes the recess 1319*a*. The screw S extends through a hole in the support panel 112 and is screwed into a female thread in the frame 111. In this way, the support panel 112, together with the carrier element 131, is connected to the frame 111 by the screw S. Here, the carrier element 131 has an effect similar to a washer, the large, planar surface of the bottom portion 1320 facing away from the formwork shell element 132 serving as bearing surface on the support panel 112. With this large bearing surface, only small tensions are introduced into the support panel 112 by the connection so that an extremely long-term stable connection is provided. As can be clearly seen, a recess with inclined walls accommodating the carrier element 131 is provided in the support panel 112. For example, this recess may be produced by embossing so that the recess is, at the same time, a corrugation. Alternatively, the recess may also be milled into the support panel 112. During the installation of the carrier element 131 in the support panel 112, the guiding portion 1318 disposed on the outside of the carrier element 131 serves as an abutment surface on the inner walls of the recess in the support panel 112.

In this way, the carrier element 131 can be easily inserted into the support panel 112 and secured on the frame 111 with the aid of the screw S there. In the illustrated embodiment, therefore, the carrier element 131 has a double function: on the one hand, it constitutes the functional counterpart of the formwork shell element 132, whereby a reversibly releasable connector 13 is formed. On the other hand, the carrier element 131, at the same time, serves as a supporting fastening element for fastening a support panel 112 on the frame 111 of a formwork carrier 11. With this combination of functions, the number of components as well as the installation time for the assembly of a formwork carrier 11 can be significantly reduced while, at the same time, an excellent connection of the elements to each other is guaranteed. In the illustrated embodiment, the carrier element 131 comprises the projecting gripping portion 1316 entering the bending recess 13222 of the formwork shell element 132. Alternatively, this design may also be configured exactly the other way round. Therefore, a carrier element 131 having the double function of also serving as a supporting fastening element for the support panel 112 may also be provided with a rigid cavity, and the associated formwork shell element 132 may comprise a connector head 1322 which is elastically deformed to the inside when the connection is established. Therefore, the embodiment in FIG. 14 may also be combined with a connecting principle as shown, for example, in FIG. 3. In such an embodiment having a reversed design or deformation function of the carrier element 131 and the formwork shell element 132 as well, a bottom portion 1320 with an attachment portion 1319 arranged concentrically thereto may be provided for also realising the function similar to a washer described above in this embodiment.

FIG. 15 shows a cut side view of an alternative formwork module 1 including a separating tool 16 which is in engagement with a formwork shell element 132. The illustration in FIG. 15 relates to an alternative embodiment of a formwork module 1 not according to the invention. The alternative formwork module 1 also comprises a formwork shell 12 which is illustrated in a cut state on the lower side of the illustration. Furthermore, the formwork module 1 comprises a formwork carrier 11 which is only illustrated in sections here. In FIG. 15, only part of a frame 111 of the formwork carrier 11 can be seen. Here, the connector 13 is a combination of a formwork shell element 132 connected to the formwork shell via a formwork shell adapter 14*a*, and a carrier element 131 formed by a recess in the formwork carrier 11, particularly in the frame 111 of the formwork carrier 111 here. Alternatively, the connector 13 may also be formed exclusively by the formwork shell element 132 here, and the recess in the formwork carrier 11 can be regarded as a part or component of the formwork carrier 11. In contrast to the embodiments illustrated and described above, the connector 13 or the formwork shell 12 and the formwork carrier 11 cannot be separated by applying a pulling force in a direction perpendicular to the surface of the formwork shell 12 alone in the embodiment illustrated in FIG. 15. For separating the connector 13, it is required that a separating tool 16 is brought in engagement with the formwork shell element 132 to elastically deform it in sections. In FIG. 15, the same embodiment of a formwork shell element 132 as in FIG. 10 can be seen in a state cut at the bottom. With respect to the formwork shell 12, the formwork shell adapter 14*a*, and the formwork shell element 132, therefore, the description relating to FIG. 10 is referred to. In the state illustrated in FIG. 15, the connector head 1322 is inserted in a recess in the frame 111, and there is a form-closed connection between the bending portions 13221 and the recess in the frame 111. On the opposite side of the frame 11, another recess is situated through which the separating tool 16 is inserted here. This separating tool 16 has a recess having a cylindrical cross section in its interior. In the illustrated embodiment, the separating tool 16 is formed by a cylindrical pipe section. The end of the separating tool 16 directed downwards in the illustration is partly guided above the connector head 1322. The peripheral portion of the cylindrical recess in the separating tool 16 abuts on respectively one tool engagement surface 13221*a* of each bending portion 13221. In the illustrated embodiment, the tool engagement surface 13221*a* is identical to the insertion surface 132211. Here, the tool engagement surface 13221*a* is inclined to the central axis of the formwork shell element 132 and of the separating tool 16. When, starting from the state illustrated in FIG. 15, a force in direction of the arrow which is directed downwards in the illustration is applied to the separating tool 16 a force directed radially inwards relative to the central axis of the formwork shell element 132 is generated on each bending portion 13221 by the engagement of the lower edge of the separating tool 16 with the tool abutment surfaces 13221*a*. These forces are represented by two arrows directed towards the central axis. The bending portions 13221 are elastically bent inwards by these radially acting forces, whereby the form-closed connection between the connector head 1322 and the recess in the frame 111 is released. When the separating tool 16 is then moved in an, in the illustration, downwards direction the formwork shell element 132 is pushed out of the formwork carrier 11 without being damaged in the process. After the removal of the separating tool 16, the bending portions 13221 elastically return to the shape which can be seen in FIG. 15. Therefore, in this embodiment as well, the connector 13 or the formwork shell element 132 can be reversibly separated from the formwork carrier 11 and therefore used multiple times. Should the formwork shell element 132 experience wear after repeated use it can be exchanged in the formwork shell adapter 14*a* in a simple manner as described in connection with the other embodiments. In the illustrated embodiment, it is quite easy to perform the handling of the separating tool 16 since it is simply inserted into a recess from the side of the formwork carrier 11 facing away from the formwork shell 12 and can then be subjected to a force in the direction of the formwork shell 12. For example, this force may be applied by a hammer blow onto the end of the separating tool 16 protruding from the formwork carrier 11. In this way, the formwork shell 12 can be quickly removed from the formwork carrier 11 and exchanged if required.

The invention claimed is:

1. A formwork module for a formwork for a building part, comprising at least one formwork carrier, and at least one formwork shell, wherein at least one connector is situated between the at least one formwork carrier and the at least one formwork shell, and the at least one connector comprises at least one carrier element which is fastened on or in the at least one formwork carrier, and at least one formwork shell element which is fastened in or on the at least one formwork shell;

and the carrier element and the at least one formwork shell element can be reversibly interconnected and form the at least one connector by means of which the at least one formwork shell can be reversibly connected to the at least one formwork carrier, wherein the reversible connection between the at least one carrier element and the at least one formwork shell element is separable by applying a force in the normal direction to the at least one formwork shell directed away from the at least one formwork carrier which is larger than a threshold separation force, and connectable by applying a force in the normal direction to the at least one formwork shell directed towards the at least one formwork carrier which is larger than a threshold connecting force, wherein the at least one formwork shell element includes a formwork shell attachment portion which is connected to the at least one formwork shell, and the connection between the at least one formwork shell element and at least one formwork shell is configured to be detachable, wherein a formwork shell adapter is disposed between the at least one formwork shell element and the at least one formwork shell, wherein the formwork shell adapter is a component which facilitates detaching and connecting the at least one formwork shell element from or to the at least one formwork shell, and the formwork shell adapter remains on or in the at least one formwork shell when the at least one formwork shell element is exchanged.

2. The formwork module according to claim 1, wherein the at least one formwork shell element comprises a plurality of formwork shell elements, the plurality of formwork shell elements being disposed on a mounting side of the at least one formwork shell, and the at least one carrier element comprises a plurality of carrier elements, the plurality of carrier elements being disposed on a side of the at least one formwork carrier facing the at least one formwork shell, and in that, therefore, the at least one connector comprises a plurality of connectors, wherein the plurality of connectors are unevenly distributed across the at least one formwork shell and the at least one formwork carrier, wherein a higher number of the plurality of connectors per surface area is situated in a peripheral portion and/or at edges than in a central area of the at least one formwork shell and the at least one formwork carrier and/or wherein the plurality of connectors have different threshold separation forces, and a first subset of the plurality of connectors having higher threshold separation forces are located in the peripheral portion and/or at the edges, and a second subset of the plurality of connectors having lower threshold separation forces are located in the central area of the at least one formwork shell and the at least one formwork carrier, wherein, the plurality of connectors are based on the same or different operating principles.

3. The formwork module according to claim 1, wherein the at least one carrier element is formed by a section of the at least one formwork carrier, wherein, the at least one carrier element is formed by a recess in the at least one formwork carrier.

4. The formwork module according to claim 1, wherein the formwork shell adapter is form-closed connected to the at least one formwork shell, and the at least one formwork shell has a concrete side which faces the building part to be constructed in use of the formwork module, and the at least one formwork shell has a mounting side located opposite of the concrete side which faces the at least one formwork carrier, wherein the at least one formwork shell element and the formwork shell adapter are disposed on or in the mounting side, wherein the formwork shell adapter is insertable into the at least one formwork shell on the mounting side of the at least one formwork shell by a movement parallel to the mounting side of the at least one formwork shell, and, in the state inserted into the at least one formwork shell, there is a form-closed connection between the at least one formwork shell and the formwork shell adapter in a direction perpendicular to the mounting side, wherein the at least one formwork shell, in a side view from a direction perpendicular to the mounting side, has a recess having an undercut, and the formwork shell adapter is inserted into the recess, wherein a section of the formwork shell adapter is disposed in the undercut of the recess, and thus a form-closed connection between the at least one formwork shell and the formwork shell adapter is provided in a direction perpendicular to the mounting side.

5. The formwork module (1) according to claim 1, wherein the at least one formwork shell, in a plan view of a mounting side, has a recess having defining walls extending perpendicular to the mounting side, and the formwork shell adapter is pressed into the recess in a direction perpendicular to the mounting side, wherein at least a section of the formwork shell adapter is positioned in the recess, and thus a force-fit connection is provided between the at least one formwork shell and the formwork shell adapter in a plane parallel to the mounting side.

6. The formwork module according to claim 1, wherein the formwork shell adapter has a recess having an undercut into which the at least one formwork shell element is reversibly insertable, wherein this reversible connection of the at least one formwork shell element to the formwork shell adapter is at least partly established by a form-closed connection of a section of the at least one formwork shell element to the undercut of the recess in the formwork shell adapter, and the form-closed connection between the at least one formwork shell element and the formwork shell adapter can be established and released by a linear movement of the at least one formwork shell element relative to the formwork shell adapter in a direction parallel to a mounting side, or the form-closed connection between the at least one formwork shell element and the formwork shell adapter can be established and released by a rotating movement of the at least one formwork shell element relative to the formwork shell adapter about a rotational axis oriented perpendicular to the mounting side.

7. The formwork module according to claim 1, wherein the at least a one formwork shell element includes a shaft and a connector head, wherein the at least one formwork shell element is connected to the at least one formwork shell at one end of the shaft, and the connector head is connected to the one end of the shaft located opposite of the at least one formwork shell, and the connector head has at least one bending portion which is elastically deformable relative to the shaft.

8. The formwork module according to claim 7, wherein the at least one bending portion has at least one insertion surface and at least one separation surface, wherein, when the at least one formwork shell element is connected to the at least one carrier element, the at least one insertion surface, at least in sections, abuts on the at least one carrier element, and, when the connection of the at least one formwork shell element to the at least one carrier element is released, the at least one separation surface, at least in sections, abuts on the at least one carrier element.

9. The formwork module according to claim 7, wherein the at least one carrier element is configured to be rigid and has a cavity substantially corresponding to the shape and size of the connector head, and the at least one carrier element has an insertion recess connecting an outer surface of the at least one carrier element to the cavity, wherein the inner diameter of the insertion recess is smaller than the largest inner diameter of the cavity and/or the insertion recess has at least one bushing insertion surface on its side facing the outer surface of the at least one carrier element and at least one bushing separation surface on its side facing the cavity, wherein the bushing insertion surface and the at least one bushing separation surface are positioned at an angle to a central axis of the insertion recess.

10. The formwork module according to claim 7, wherein the at least one carrier element is configured to be rigid and has a gripping portion substantially corresponding to the shape and size of a bending recess in the connector head adjacent to a bending portion, wherein the gripping portion protrudes beyond adjoining sections of the at least one carrier element adjacent to it, and the at least one carrier element has a bending portion accommodation at least partly enclosing the gripping portion adjacent to the gripping portion, and the bending portion accommodation at least partly accommodates the bending portion of the at least one formwork shell element when the at least one connector is connected, and the at least one carrier element comprises a bottom portion configured to be planar at least in sections which is substantially oriented perpendicular to a central axis of the gripping portion, and the bottom portion abuts on a support panel or a frame of the at least one formwork carrier in a planar manner, and the at least one carrier element has an attachment portion at least partly disposed in the gripping portion, wherein the attachment portion is provided for fastening the at least one carrier element to the frame or to a support panel.

11. The formwork module according to claim 10, wherein the at least one carrier element is inserted into a recess in a support panel, wherein the bottom portion of the at least one carrier element abuts on a boundary surface of the recess in the support panel in a planar manner, and the at least one carrier element, together with the support panel, is fastened to a frame of the at least one formwork carrier by means of a fastening element, wherein the fastening element is passed through the attachment portion or is part of the attachment portion.

12. The formwork module according to claim 10, wherein, in a plan view of the at least one carrier element from a direction perpendicular to a mounting side, the gripping portion and the bending portion accommodation have a circular shape and are positioned concentrically relative to each other, wherein the attachment portion is positioned concentrically to the gripping portion and to the bending portion accommodation.

13. The formwork module according to claim 1, wherein the at least one formwork carrier comprises at least one support panel which is connected to the frame, wherein the at least one support panel is provided for the connection to the at least one formwork shell, and at least one carrier element of at least one connector is situated on or in the at least one support panel, wherein, the at least one support panel is detachable from the frame and therefore configured to be exchangeable.

14. A use of a connector in a formwork module according to claim 1 for detachably connecting the formwork carrier to the formwork shell.

15. A method for connecting at least one formwork shell to at least one formwork carrier of a formwork module according to claim 1, comprising:

positioning the at least one formwork shell relative to the at least one formwork carrier, wherein the at least one formwork shell element is aligned in axial alignment with the at least one carrier element, applying a normal force to the at least one formwork shell in a direction of the at least one formwork carrier, wherein the normal force is larger than the sum of the threshold connecting force of all of the at least one connector between the formwork shell and the formwork carrier, moving the at least one formwork shell towards the at least one formwork carrier in the normal direction to the at least one formwork shell until the at least one formwork shell abuts on the at least one formwork carrier in a planar manner.

16. The formwork module according claim 10 wherein the attachment portion comprises at least one recess which extends completely through the carrier element in a direction perpendicular to a mounting side.

17. The formwork module according claim 8 wherein the at least one insertion surface and the at least one separation surface are positioned at different angles to a central axis of the shaft.

18. The formwork module according to claim 10, wherein the at least one carrier element is inserted into a recess in the support panel, wherein the bottom portion of the at least one carrier element abuts on a boundary surface of the recess in the support panel in a planar manner, and the at least one carrier element, together with the support panel, is fastened to a frame of the at least one formwork carrier by means of a screw, wherein the screw is passed through the attachment portion or is part of the attachment portion.

* * * * *